US011170524B1

(12) United States Patent
Mishra et al.

(10) Patent No.: US 11,170,524 B1
(45) Date of Patent: Nov. 9, 2021

(54) INPAINTING IMAGE FEEDS OF OPERATING VEHICLES

(71) Applicant: Amazon Technologies, Inc., Seattle, WA (US)

(72) Inventors: Pragyana K. Mishra, Seattle, WA (US); Gur Kimchi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/449,230

(22) Filed: Jun. 21, 2019

(51) Int. Cl.
*G06T 7/73* (2017.01)
*B64C 39/02* (2006.01)
*G06T 3/00* (2006.01)
*G06T 7/33* (2017.01)
*G06T 7/194* (2017.01)

(52) U.S. Cl.
CPC .............. *G06T 7/73* (2017.01); *B64C 39/024* (2013.01); *G06T 3/0006* (2013.01); *G06T 7/194* (2017.01); *G06T 7/33* (2017.01); *B64C 2201/123* (2013.01); *B64C 2201/127* (2013.01)

(58) Field of Classification Search
CPC .. G06T 7/73; G06T 7/194; G06T 7/33; G06T 3/0006; B64C 39/024
See application file for complete search history.

(56) References Cited

U.S. PATENT DOCUMENTS

| 2015/0296141 | A1* | 10/2015 | Zhang | G06T 3/4038 |
| | | | | 348/39 |
| 2019/0236764 | A1* | 8/2019 | Lindsey | G06T 7/174 |
| 2019/0384283 | A1* | 12/2019 | Chowdhary | G06K 9/6263 |
| 2020/0020072 | A1* | 1/2020 | Ely | G06T 3/0075 |

* cited by examiner

*Primary Examiner* — Kevin Ky
(74) *Attorney, Agent, or Firm* — Athorus, PLLC

(57) ABSTRACT

Affected areas of images captured by cameras that are experiencing one or more anomalies may be modified by inpainting portions of counterpart images onto the affected areas. Where a camera provided aboard an operating vehicle (e.g., an aerial vehicle) is experiencing an anomaly that adversely affects the quality of images captured thereby, counterpart images that are captured by other cameras (e.g., cameras provided aboard the vehicle or elsewhere) at the same time, or by the affected camera at an earlier time, may be used for inpainting. Portions of counterpart images may be selected for inpainting according to a transform function that takes into account a pose of an affected camera, dynamics of an operating vehicle or any other factors. Images that have been modified by inpainting may be utilized by an operating vehicle for any purpose, such as computer vision applications, navigation, guidance, or collision avoidance.

20 Claims, 19 Drawing Sheets

FRAME OF VIDEO FEED 2 CAPTURED AT TIME $t_1$
INCLUDING PORTION CORRESPONDING TO
CAMERA ANOMALY IN VIDEO FEED 1

PATCH UNAFFECTED PORTION OF IMAGE FROM VIDEO FEED 2 CAPTURED AT TIME $t_1$ ONTO AFFECTED PORTION OF IMAGE FROM VIDEO FEED 1 CAPTURED AT TIME $t_1$

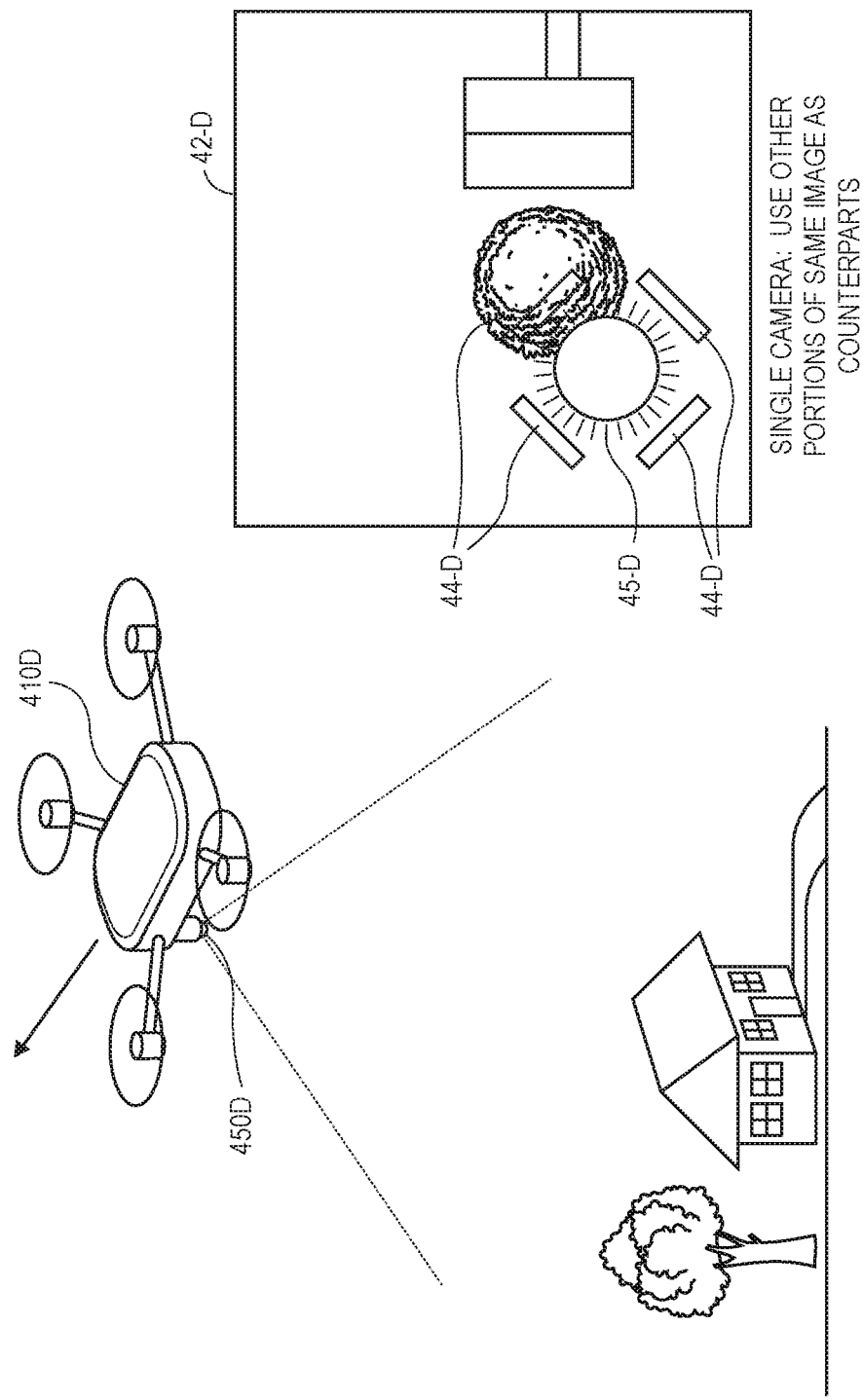

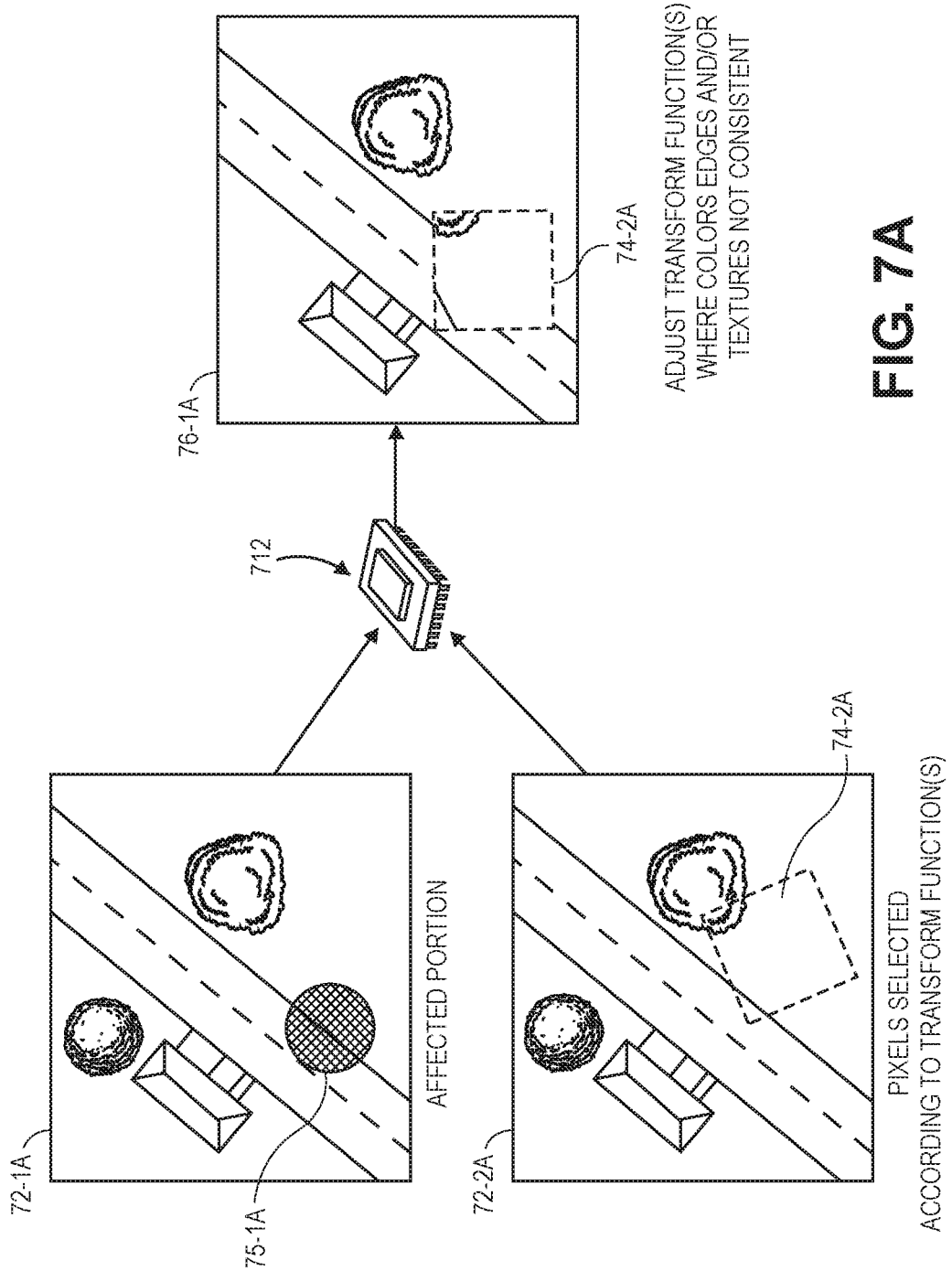

INPAINTING IMAGE FEEDS OF OPERATING VEHICLES

BACKGROUND

Autonomous vehicles (including, specifically, unmanned aerial vehicles, or UAVs) are frequently equipped with one or more imaging devices such as digital cameras which may be used to aid in their operation, e.g., to determine when an aerial vehicle has arrived at or passed over a given location, or is within range of one or more structures, features, objects or humans (or other animals), or for any other purpose. For example, many aerial vehicles are programmed or equipped to capture and process images for any purpose, such as detection, recognition or other computer vision applications.

Likewise, stereo ranging (or stereo triangulation) is a process by which distances or ranges to objects may be determined from digital images captured using imaging devices, such as digital cameras, that are separated by a fixed distance. By processing pairs of images of an environment that are captured by imaging devices, ranges to points expressed in both of the images (including but not limited to points associated with specific objects) may be determined by finding a virtual intersection of pairs of lines extending from the respective lenses or sensors of the imaging devices through representations of such points within each of the images. A range to a single point within an environment at a given time may be determined based on a baseline distance between the lenses or sensors of the imaging devices that captured such images and a disparity, or a distance between corresponding representations of a single point in space expressed within both of the images when the images are superimposed upon one another. Such processes may be completed for any number of points in three-dimensional space that are expressed in both of the images, and a model of such points, e.g., a point cloud, a depth map or a depth model, may be defined accordingly.

As with any high-technology equipment, imaging devices may be plagued by faults or discrepancies associated with one or more of their optical, electrical or mechanical components. Some of the faults or discrepancies that may be encountered may affect the quality of the images or other information or data sensed by such devices. Such faults or discrepancies may occur at random or upon the occurrence of one or more performance-related events, and may impact the clarity or quality of such images, information or data.

BRIEF DESCRIPTION OF THE DRAWINGS

FIGS. 4A through 4D are views of aspects of one system for inpainting image feeds of operating vehicles in accordance with embodiments of the present disclosure.

FIGS. 7A and 7B are views of aspects of one system for inpainting image feeds of operating vehicles in accordance with embodiments of the present disclosure.

DETAILED DESCRIPTION

Figure 1A:
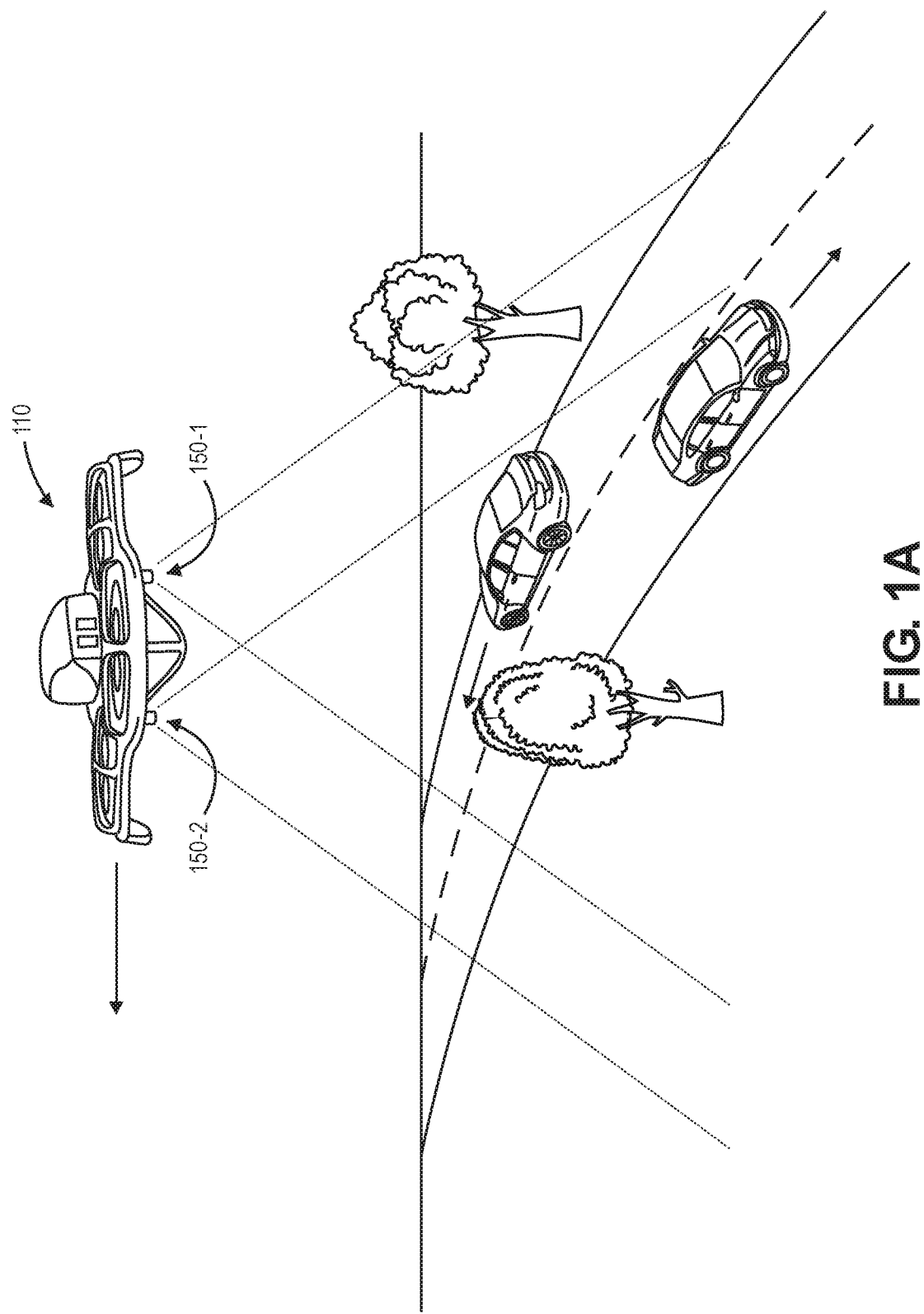
FIGS. 1A through 1G are views of aspects of one system for inpainting image feeds of operating vehicles in accordance with embodiments of the present disclosure.

As is set forth in greater detail below, the present disclosure is directed to inpainting image feeds of operating vehicles. More specifically, the systems and methods disclosed herein are directed to determining that a digital camera or another imaging device provided aboard an operating vehicle, e.g., an unmanned aerial vehicle, an autonomous ground vehicle, or any other type or form of vehicle, is experiencing one or more anomalies or is otherwise capturing imaging data depicting one or more visible defects. Upon determining that an imaging device is experiencing an anomaly, one or more affected areas of a first image captured by the imaging device or a first image plane of the imaging device are identified. A portion of a second image that corresponds to the affected areas of the first image or the first image plane is identified, e.g., according to one or more transform functions, and inpainted, patched or superimposed onto or combined with at least the affected areas of the first image. The second image may have been captured using another imaging device provided aboard the vehicle (e.g., another imaging device of a stereo rig or other system), or an external system, e.g., another vehicle, or another fixed or mobile object. Alternatively, the second image may have been captured by the first imaging device, e.g., prior to or after the first image, and identified for use in modifying the affected areas of the first image. Subsequently, the inpainted, patched, superimposed or otherwise modified first image may be used for any purpose associated with operations of the vehicle, including but not limited to computer vision applications, ranging, object avoidance, take-offs or landings, or any other operations.

A geometric transform function may be generated for one or more pixels of an image or an image plane of one imaging device, where such pixels have been determined to be adversely affected by one or more anomalies. The geometric transform function may be used to identify corresponding pixels of images based on poses of the imaging devices that captured the images, e.g., positions and orientations of the imaging devices at times at which the images were captured, as well as dynamics of the vehicles, such as information or data regarding their respective velocities, altitudes or orientations, or any factors regarding environments in which the vehicles are operating. The geometric transform function may thus be used to warp, morph or otherwise specifically distort a portion of one image prior to inpainting, patching or superimposing the portion onto or into another image. The efficacy of a geometric transform function may be determined based on the extent to which lines or other features are evident within an image after one or more portions of the image have been inpainted, patched or superimposed thereon or combined therewith, or on any other basis, and the geometric transform function may be modified, as necessary.

Furthermore, a color transform function may be applied to an image that has been modified to incorporate a portion of another image therein, e.g., by inpainting, patching or superimposing. The color transform function may be configured or programmed to match pixel intensities or other features of unaffected portions of one image to portions of another image that are selected, e.g., by a geometric transform function, for inpainting, patching or superimposing onto affected portions of the image.

Referring to FIGS. 1A through 1G, views of aspects of one system for inpainting image feeds of operating vehicles in accordance with embodiments of the present disclosure are shown. As is shown in FIG. 1A, an aerial vehicle 110 passes over a scene at a selected velocity or altitude. The scene includes a roadway having one or more automobiles or other vehicles traveling thereon. The aerial vehicle 110 includes a pair of imaging devices 150-1, 150-2 aligned in a substantially downward orientation with respect to one or more principal axes of the aerial vehicle 110. The imaging devices 150-1, 150-2 are configured to capture imaging data regarding one or more surfaces or other objects that are located beneath the aerial vehicle 110, including but not limited to the roadway and/or the automobiles or other vehicles traveling thereon.

Figure 1B:
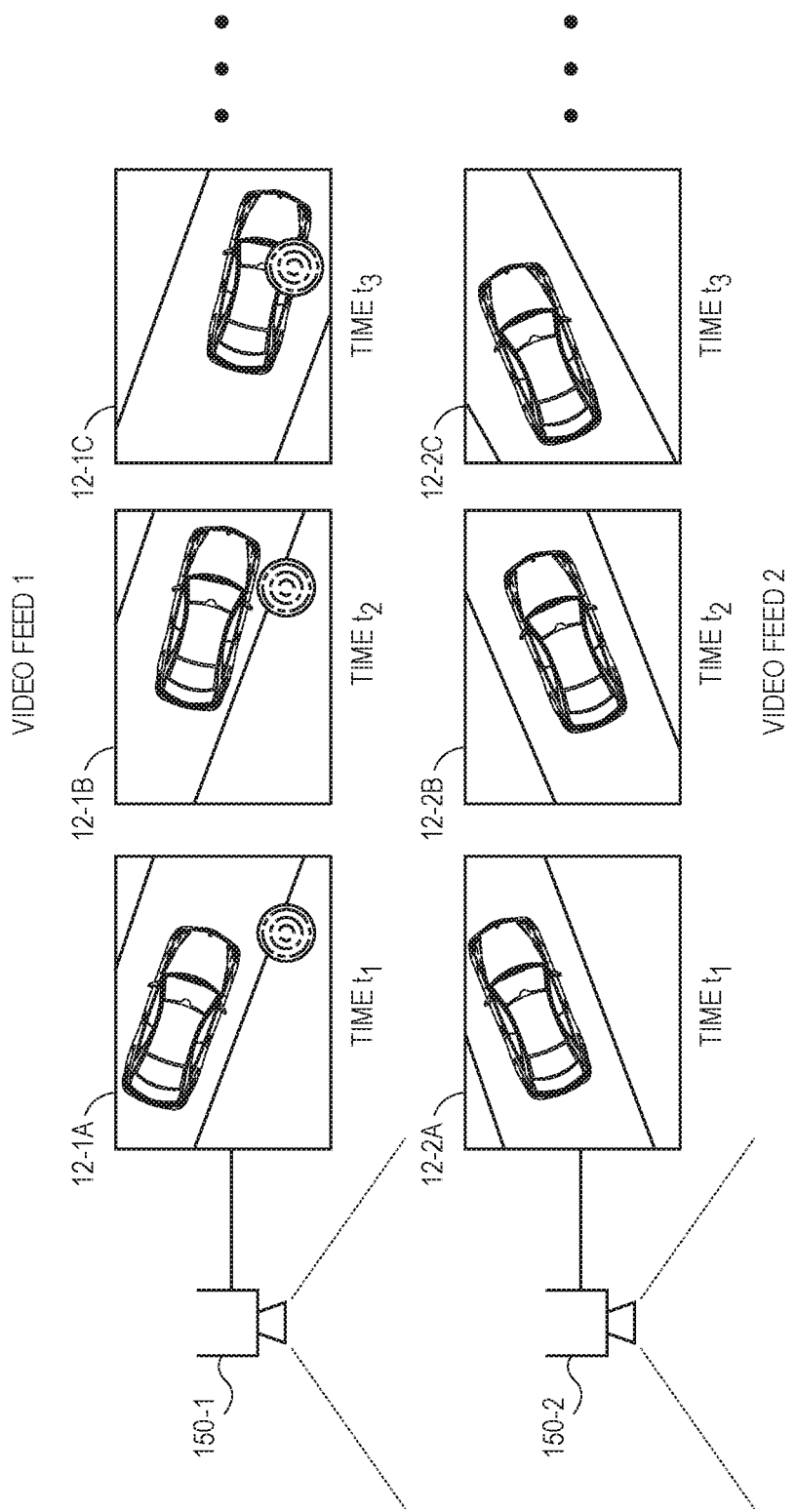

As is shown in FIG. 1B, the imaging device 150-1 captures a video feed including a plurality of image frames 12-1A, 12-1B, 12-1C and the imaging device 150-2 captures a video feed including a plurality of image frames 12-2A, 12-2B, 12-2C. The image frames 12-1A, 12-1B, 12-1C and the image frames 12-2A, 12-2B, 12-2C, respectively, are captured at times $t_1$, $t_2$, $t_3$, and so on. Each of the image frames 12-1A, 12-1B, 12-1C and the image frames 12-2A, 12-2B, 12-2C depicts portions of the surfaces within fields of view of the imaging device 150-1 and the imaging device 150-2, respectively, at the times $t_1$, $t_2$, $t_3$. Moreover, each of the image frames 12-1A, 12-1B, 12-1C captured using the imaging device 150-1 depicts one or more visible defects 15-1A, 15-1B, 15-1C or other areas that are affected by one or more anomalies plaguing the imaging device 150-1.

Figure 1C:
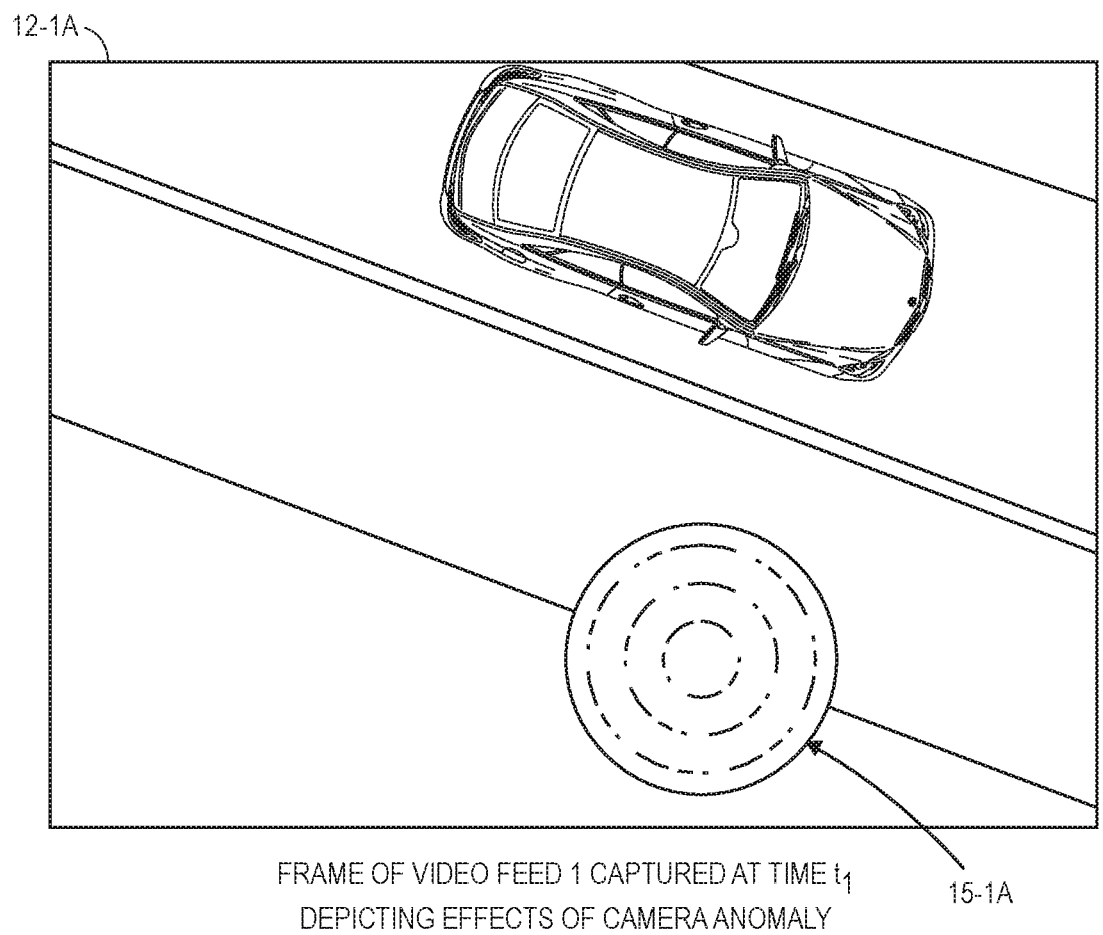

As is shown in FIG. 1C, the image frame 12-1A captured by the imaging device 150-1 at the time $t_1$ includes the visible defect or other affected area 15-1A. For example, at the time $t_1$ the aerial vehicle 110 may have encountered any number of adverse events or circumstances that caused the imaging device 150-1 to be impacted by dust, moisture or other airborne impurities, or subject to adverse lighting conditions. One or more surfaces of a lens of the imaging device 150-1 may also have been marred by fingerprints, smudges or other like impediments. Alternatively, the imaging device 150-1 may have been subjected to long-term degradation of sensors or other optical equipment due to incident sunlight, reflections, bright spots or specularities, or reflections of light from a smooth surface of an object, which causes incident rays to be reflected from the surface at common angles of reflection, thereby saturating the sensors and forming glares in images captured thereby. Specular reflection may be particularly acute where incident light originates from a single point, such as the sun, or from a single, particularly bright artificial light source. Any number of other anomalies affecting the imaging device 150-1, the aerial vehicle 110, or any other systems or components associated with the imaging device 150-1 may cause visual defects, such as the visual defect 15-1A, to appear within images captured using the imaging device 150-1.

Figure 1D:
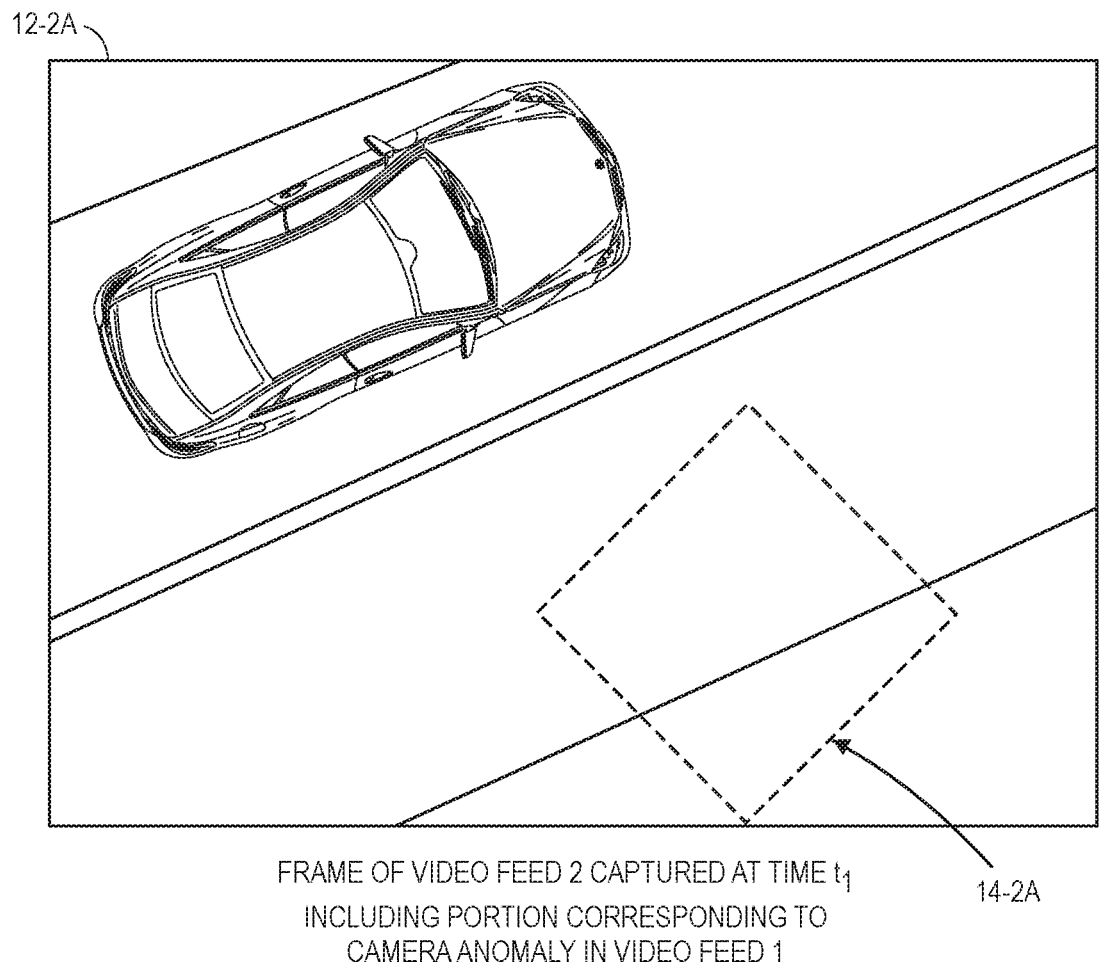

As is shown in FIG. 1D, after the visual defect 15-1A is detected within the image frame 12-1A captured by the imaging device 150-1 at the time $t_1$, a corresponding portion 14-2A of the image frame 12-2A captured by the imaging device 150-2 at the time $t_1$ is identified. The portion 14-2A of the image frame 12-2A may be selected according to a geometric transform function or other method or technique. For example, in some embodiments, where affected pixels within the image frame 12-1A or an image plane of the imaging device 150-1 are identified, one or more affine transformations such as a translation, a scaling, a shearing and/or a rotation, one or more perspective transformations, one or more global or local transformations, or another geometric transform functions, e.g., linear or non-linear transformations, may be used to identify corresponding pixels within the image frame 12-2A or an image plane of the imaging device 150-2. In some embodiments, the geometric transform function may consider not only the respective poses of the imaging devices 150-1, 150-2 but also one or more dynamics of the aerial vehicle 110, including but not limited to the velocity or the altitude of the aerial vehicle 110, or any other factor that may impact or otherwise affect the appearance of background or foreground objects that are present within the field of view of the imaging device 150-1, 150-2. In some embodiments, the portion 14-2A may include the same number of pixels as the visual defect 15-1A, or each of such pixels may have the same size as the pixels of the visual defect 15-1A. Alternatively, in some other embodiments, the portion 14-2A may include a different number of pixels as the visual defect 15-1A, or each of such pixels may have different sizes as the pixels of the visual defect 15-1A.

Figure 1E:
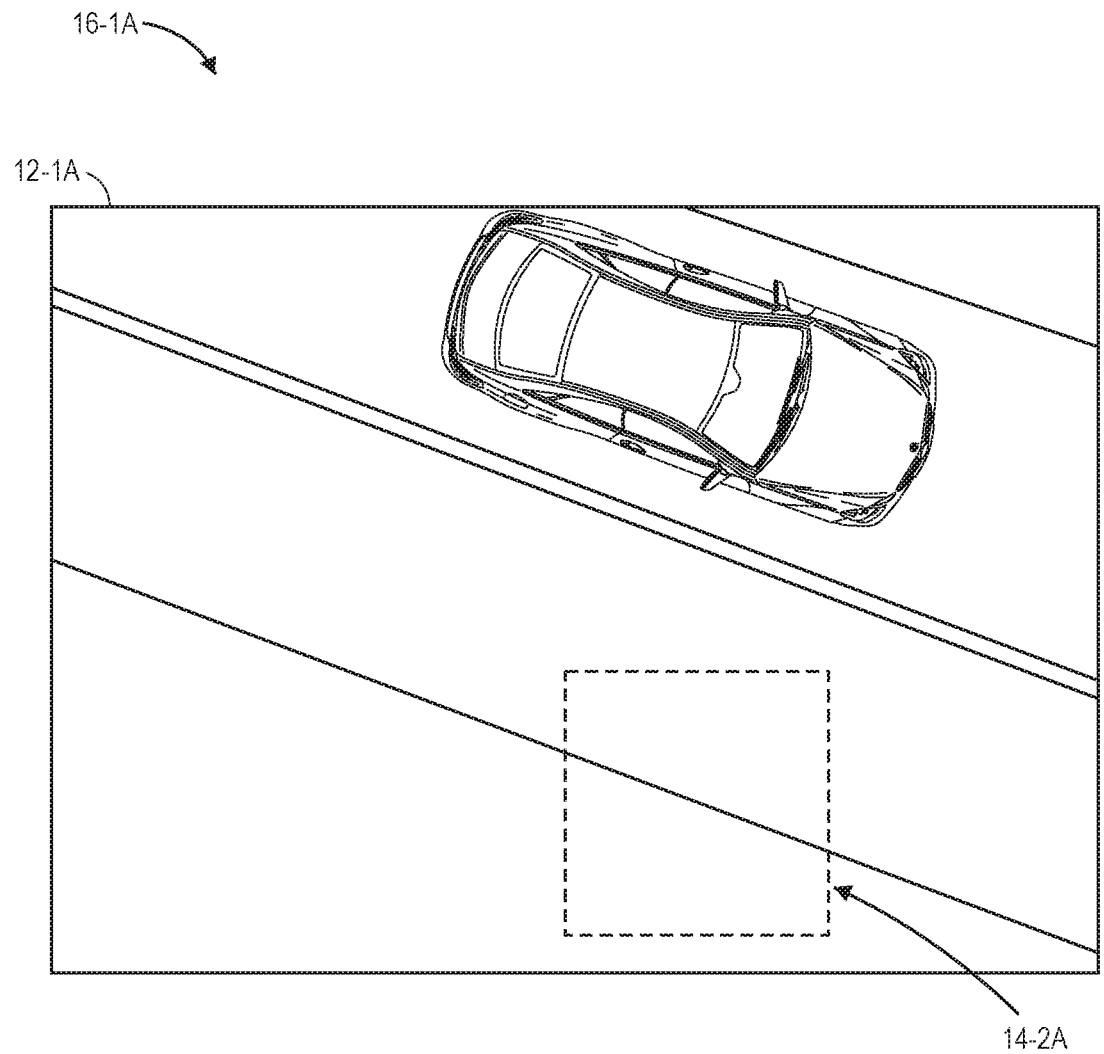

As is shown in FIG. 1E, a modified image 16-1A is generated by patching the portion 14-2A of the image frame 12-2A captured by the imaging device 150-2 at the time $t_1$ onto the image frame 12-1A captured by the imaging device 150-1 at the time $t_1$. For example, the portion 14-2A of the image frame 12-2A may be applied to or combined with the image frame 12-1A as a whole, or to a balance of the image frame 12-1A that does not include the visual defect 15-1A, in any manner.

Figure 1F:
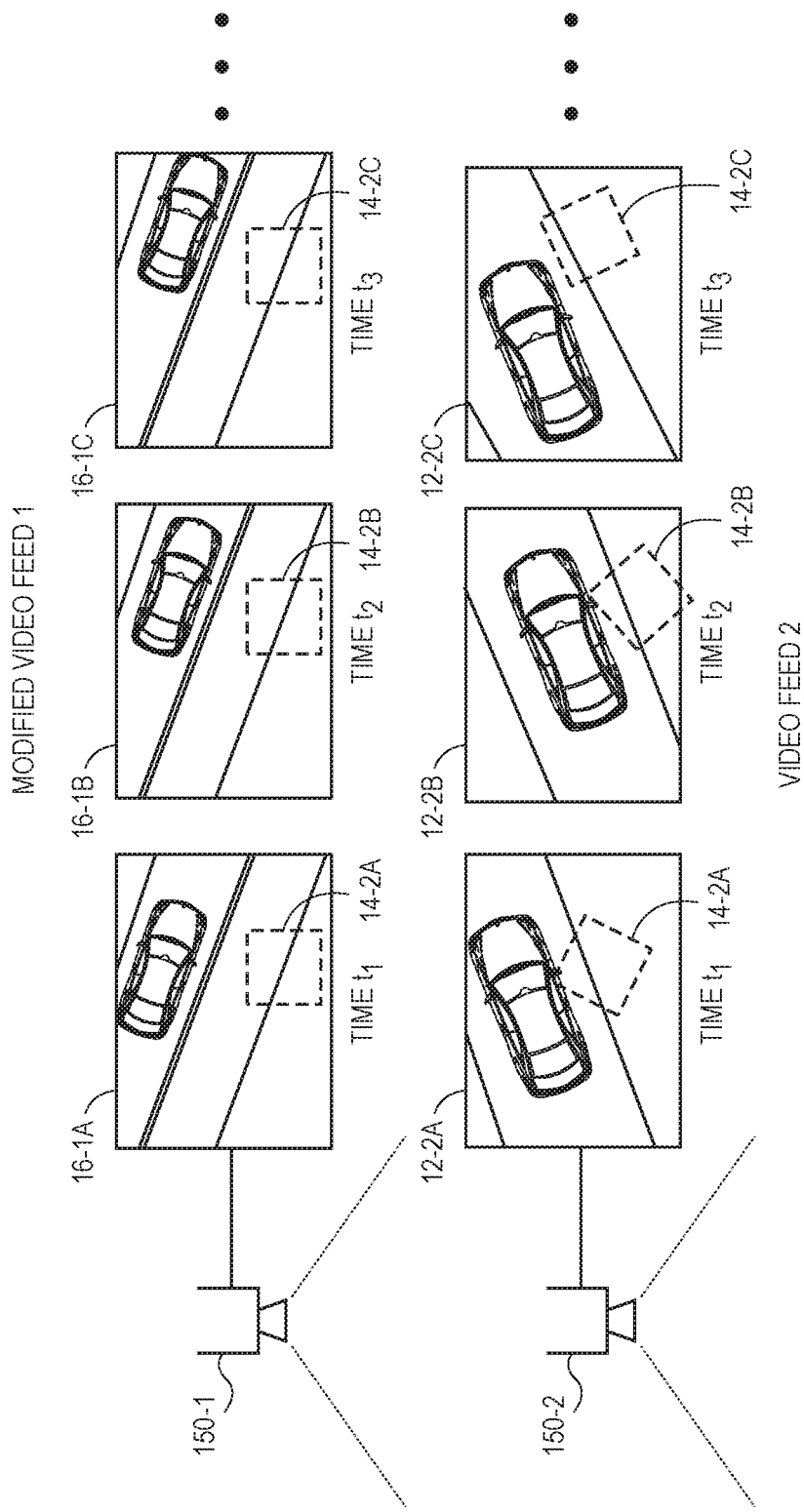

As is shown in FIG. 1F, a modified video feed including a plurality of modified images 16-1A, 16-1B, 16-1C is generated by combining the portions 14-2A, 14-2B, 14-2C of the image frames 12-2A, 12-2B, 12-2C of the video feed captured by the imaging device 150-2, in a manner similar to that which is shown in FIG. 1E. For example, each of the affected areas 15-1A, 15-1B, 15-1C of the image frames 12-1A, 12-1B, 12-1C shown in FIG. 1B is replaced or covered by the portions 14-2A, 14-2B, 14-2C of the image frames 12-2A, 12-2B, 12-2C to form the modified images 16-1A, 16-1B, 16-1C. Once the image frames 12-1A, 12-1B, 12-1C have been modified to remove the effects of the affected areas 15-1A, 15-1B, 15-1C, the modified images 16-1A, 16-1B, 16-1C may be used for any purpose, including but not limited to any of the purposes for which the image frames 12-1A, 12-1B, 12-1C were originally captured.

Figure 1G:
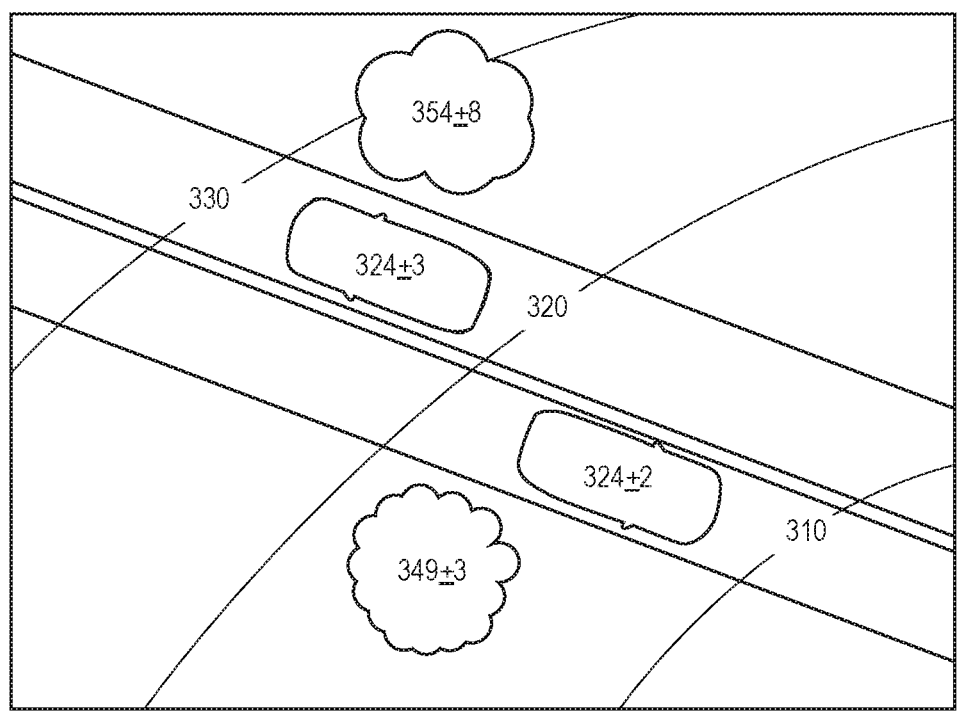

As is shown in FIG. 1G, a depth map of distances to ground-based surfaces is generated based on the modified video feed of the modified images 16-1A, 16-1B, 16-1C, and the image frames 12-2A, 12-2B, 12-2C captured using the imaging device 150-2. For example, the depth map shows distances or ranges to one or more ground surfaces, objects on such ground surfaces, or tree life or other features.

Accordingly, images captured using imaging devices provided aboard an operating vehicle, such as an aerial vehicle, a ground-based vehicle, or any other vehicle, that depict affected areas of such images that depict manifestations of anomalies experienced by the imaging devices may be modified to remove the effects of such anomalies, which may include one or more of cracked lenses, improper alignments or orientations, specularities, motor failures, moisture, dirt or other debris, fouling on a lens, poor focusing. In particular, portions of counterpart images may be inpainted, patched or superimposed onto affected areas of such images, or the images may be otherwise modified to include the portions of the counterpart images, in a manner that removes the affected areas therefrom, or otherwise renders the affected areas invisible. Once images that have been captured by an imaging device that is experiencing an anomaly have been so modified, the modified images may be utilized for any purpose for which the images were originally intended, including but not limited to computer vision applications, navigation, guidance, or collision avoidance, or others.

The imaging devices may be digital cameras (e.g., black-and-white, grayscale or color cameras) or any other devices for capturing and interpreting light that is reflected from one or more objects. For example, the imaging devices may be aligned at any angle or orientation with respect to an operating vehicle, including but not limited to the principal axes of the aerial vehicle, viz., a normal axis (or yaw axis), a lateral axis (or pitch axis), and a longitudinal axis (or roll axis) of the vehicle.

The counterpart images from which portions are identified and selected for inpainting, patching, superimposing or otherwise combining with images captured by imaging devices that are experiencing one or more anomalies may be obtained from any source. For example, in some embodiments, a counterpart image may be obtained from another imaging device that is operated in concert with the imaging device that is experiencing the anomaly, e.g., where two or more imaging devices are provided aboard an operating vehicle with similar, parallel and/or overlapping fields of view and configured to capture imaging data simultaneously or substantially simultaneously. In some other embodiments, a counterpart image may be obtained from an independent system having another imaging device that has a field of view that is similar or parallel to, or overlaps with, a field of view of an imaging device that is experiencing the anomaly, and is configured to capture imaging data simultaneously or substantially simultaneously with the affected imaging device. In some other embodiments, a counterpart image may have been previously captured using the imaging device that is experiencing the anomaly, e.g., prior to the anomaly.

Images may be inpainted, patched, superimposed, or otherwise combined through the use of one or more transform functions. A geometric transform function may be an affine transformation, a perspective transformation, or another function (e.g., a linear or non-linear transformation) that is configured to determine, for each pixel of an image captured by an imaging device or each pixel of an image plane of the imaging device, one or more pixels of an image captured by another imaging device, or pixels of an image plane of the imaging device, that may be used in inpainting, patching, superimposing or otherwise modifying images captured by the imaging device in the event of an anomaly. The portions of the counterpart images that are identified or selected by one or more geometric transform functions are the same size or shape as the affected areas of the images, or of larger sizes or different shapes. Additionally, the geometric transform functions may be configured to select portions of counterpart images on any basis, including but not limited to dynamic features or variables of the operating vehicle, poses of the imaging devices, or any other factors. The geometric transform function may thus be configured to take into account constraints such as distances between an affected portion of an image and a portion of a counterpart image in spatial or temporal dimensions, or an overall appearance of a modified image after the portion of the counterpart image has been inpainted, patched, superimposed or otherwise added to the image.

For example, in some embodiments, imaging devices may be configured to determine stereo distance information according to any number of stereo ranging algorithms or techniques. Outputs from such algorithms or techniques may be generated or stored in any form, and used for any purpose. Distances to objects or features in an environment determined according to stereo ranging algorithms or techniques may be aggregated into a depth map or profile, that identifies or represents nominal or average distances to such objects or features and tolerances associated with such distances. In some other embodiments, a point cloud or other three-dimensional representation of an environment may be generated and stored in one or more data files. The point cloud may represent positions of each of the points that appear in both of the images of a pair, with pixel-level resolution.

Additionally, one or more color transform functions may be used to ensure that when a portion of an image depicting one or more foreground or background features is inpainted, patched, superimposed or otherwise added to another image that also depicts the foreground or background features, attributes of colors of the portion of the image are consistent with attributes of the other image. In some embodiments, a function that matches or balances colors within an image may be executed on an image that has been modified by inpainting, patching or superimposing another image thereon, or in any other manner. In some embodiments, a color transform function may include one or more histogram matching or histogram equalization functions. Alternatively, any other function that matches or balances the colors may be utilized.

Imaging data (e.g., visual imaging data or depth imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network such as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color national flag blue is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Distances (or depths or ranges) to objects that are represented in a pair of stereo images captured by imaging devices (e.g., digital cameras) having fields of view that overlap, at least partially, may be determined according to one or more stereo ranging techniques. For each point of each object that appears in both of the images, lines extending from the respective lenses, lens modules or other sensors of the respective imaging devices through representations of the points of the objects in each of the images will virtually intersect at a location corresponding to the actual position of that point, in three-dimensional space. Through the use of traditional geometric principles and properties, e.g., the properties of similar triangles, as well as the known or knowable variables such as baseline distance or separation between the imaging devices, the disparity between the points within the respective images and the focal lengths of the respective imaging devices, coordinates of the intersecting point may be determined accordingly.

In order to determine stereo distance information from a pair of images, each surface point that is visible within a first one of the images must be identified in the second one of the images, and the geometric position of imaging devices that captured each of the images must be known. Representations of a common point within two stereo images are sometimes called epipoles, or a conjugate pair of such epipoles, and the disparity is defined as the distance between the conjugate pair of epipoles when the two images are superimposed.

Where a point in space appears in two images, e.g., as epipoles, a plane defined by the positions of the respective epipoles within the images and an actual position of the point in space is called an epipolar plane. The images may then be co-aligned based on their contents, e.g., along lines corresponding to intersections of the epipolar plane with the respective image planes, or their respective epipolar lines. After the images have been aligned based on their contents, an actual position of the object may be determined by triangulating lines extending from lenses, lens modules or other sensors of an imaging device through the representations of the points in the respective images within the imaging plane. An intersection of such lines corresponds to the actual position of the point, and a distance to the point may be determined accordingly based on this actual position. Stereo ranging algorithms and techniques may be used to determine ranges or distances to each of the points that appears in both of the images, and such ranges or distances may be used to define a point cloud, a depth map or another three-dimensional model of the environment in which the object is provided. The depth model may be stored in a data file (e.g., a depth image) or utilized for any purpose, including but not limited to computer vision applications, navigation, guidance, or collision avoidance.

Stereo ranging algorithms and techniques thus require determining correspondences of the epipoles in each of the pair of images, with each of the epipoles corresponding to a common point in three-dimensional space. When a plurality of correspondences of epipoles are identified from each of a pair of images of a scene, disparities for each of the conjugate pairs of epipoles may be determined, and a map of such disparities that mimics a three-dimensional structure of the scene may be reconstructed accordingly if information regarding aspects of the scene, e.g., geometric parameters such as the baseline distance or separation, the focal lengths of the imaging devices and others, is known.

The systems and methods disclosed herein are not limited to the modification of images for use in stereo ranging techniques. Rather, one or more of the embodiments disclosed herein may be used in connection with any application or purpose for which images are captured by imaging devices provided aboard operating vehicles, such as detection, recognition or other computer vision applications.

Figure 2:
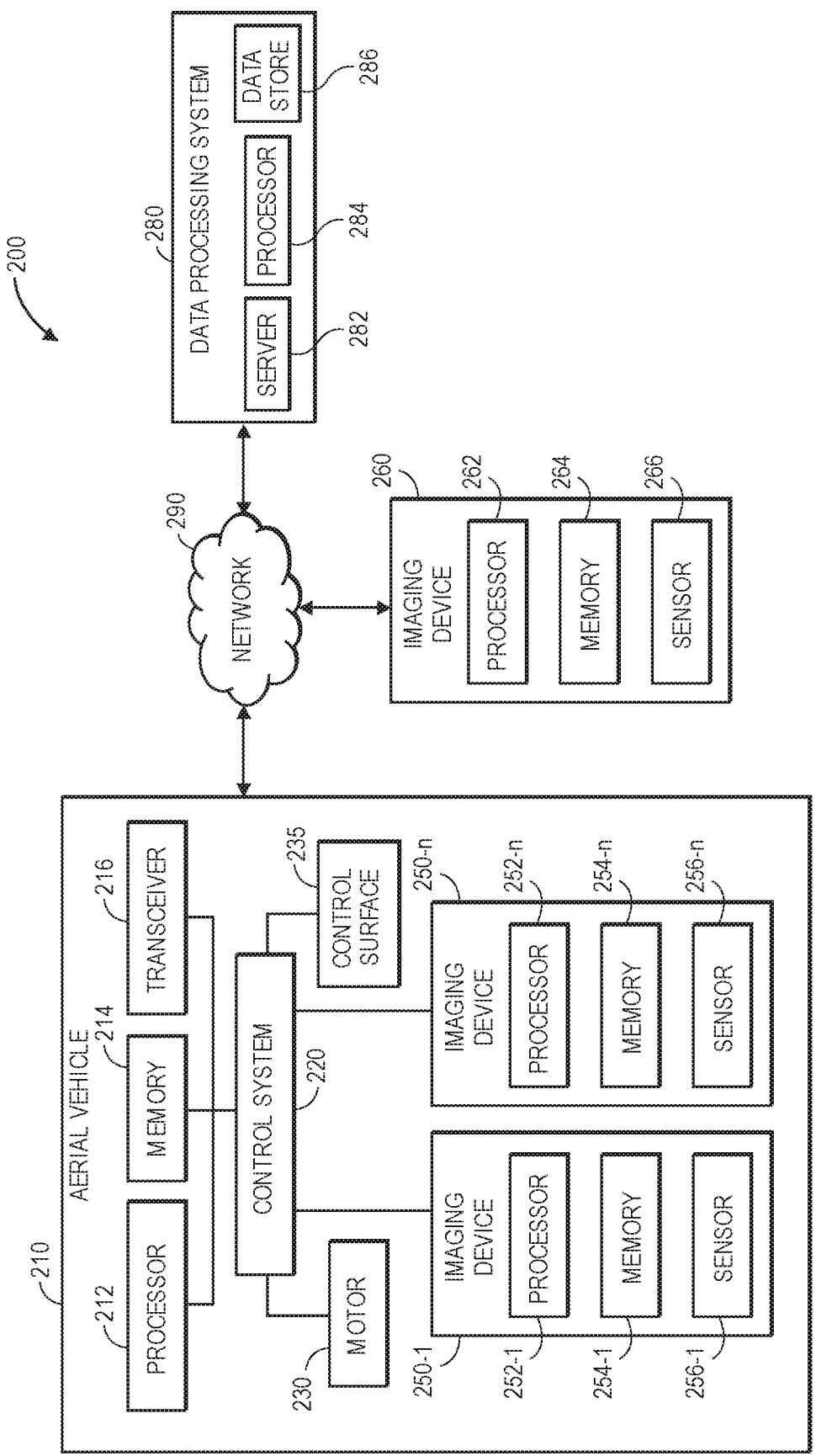
FIG. 2 is a block diagram of one system for inpainting image feeds of operating vehicles in accordance with embodiments of the present disclosure.

Referring to FIG. 2, a block diagram of one system 200 for inpainting image feeds of operating vehicles in accordance with embodiments of the present disclosure is shown.

The system 200 of FIG. 2 includes an aerial vehicle 210, an imaging device 260 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, the aerial vehicle 210 includes a processor 212, a memory 214 and a transceiver 216, as well as a control system 220, one or more propulsion motors 230 and one or more control surfaces 235 and a plurality of imaging devices 250-1 . . . 250-n. Additionally, the aerial vehicle 210 may include any number of other components, including but not limited to airframes, propellers, inertial measurement units or other navigation systems, item engagement systems, landing gear components, lighting systems, sensors, or others.

The processors 212 may be configured to perform any type or form of computing function. For example, the processors 212 may control any aspects of the operation of the aerial vehicle 210 and any computer-based components thereon, including but not limited to the propulsion motors 230, the control surfaces 235, the imaging devices 250-1 . . . 250-n and any propellers, inertial measurement units or other navigation systems, item engagement systems, landing gear components, lighting systems or other operational or environmental sensors. For example, the processors 212 may control the operation of one or more control systems or modules, such as the control system 220, for generating instructions for conducting operations of the aerial vehicle 210, including but not limited to instructions for causing the propulsion motors 230 to operate at a predetermined or selected speed, for causing propellers to rotate at a predetermined or selected pitch or configuration, for operating the control surfaces 235 in predetermined or selected positions or at predetermined or selected angles, or for causing one or more sensors (e.g., the imaging devices 250-1 . . . 250-n) to capture information or data of any type or form. The processors 212 may communicate with the data processing system 280 or one or more other computer devices (not shown) over the network 290, through the sending and receiving of digital data.

The processors 212 may be a uniprocessor system including one processor, or a multiprocessor system including several processors (e.g., two, four, eight, or another suitable number), and may be capable of executing instructions. For example, in some embodiments, the processors 212 may be a general-purpose or embedded processor implementing any of a number of instruction set architectures (ISAs), such as the x86, PowerPC, SPARC, or MIPS ISAs, or any other suitable ISA. Where one or more of the processors 212 is a part of a multiprocessor system, each of the processors within the multiprocessor system may implement the same ISA, or different ISAs.

Additionally, the memory or storage components 214 (such as databases or data stores) are configured for storing any type of information or data, e.g., instructions for operating the aerial vehicle 210, or information or data captured during operations of the aerial vehicle 210. The memory components 214 may be configured to store executable instructions, flight paths, flight control parameters and/or other data items accessible by or to the processors 212. The memory components 214 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceivers 216, e.g., by transmission media or signals, such as electrical, electromagnetic, or digital signals, which may be conveyed via a communication medium such as a wired and/or a wireless link.

The transceivers 216 may be configured to enable the aerial vehicle 210 to communicate using one or more wired or wireless systems or components, e.g., wired technologies such as Universal Serial Bus (or "USB") or fiber optic cable, or standard wireless protocols, such as over the network 290 or directly. In some embodiments, the transceivers 216 may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 216 may be configured to transmit and receive light signals, and may include one or more light emitting diode (or "LED") transmitters and/or one or more optical sensors or receivers. In still other embodiments, the transceivers 216 may be configured to transmit and receive acoustic signals, and may include one or more devices having transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters, as well as one or more microphones, piezoelectric sensors, vibration sensors or other acoustic sensors. Such signals may be open and unencrypted, and captured and interpreted by any vehicle, station or object within a signal range of the transceivers 216, or subject to any form or level of encryption.

The transceivers 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems via the network 290. For example, in some embodiments, the transceivers 216 may be configured to coordinate I/O traffic between the processors 212 and one or more onboard or external computer devices or components. The transceivers 216 may perform any necessary protocol, timing or other data transformations in order to convert data signals from a first format suitable for use by one component into a second format suitable for use by another component. In some embodiments, the transceivers 216 may include support for devices attached through various types of peripheral buses, e.g., variants of the Peripheral Component Interconnect (PCI) bus standard or the Universal Serial Bus (USB) standard. In some other embodiments, functions of the transceivers 216 may be split into two or more separate components, or integrated with the processors 212. Although the transceivers 216 are shown as single components for transmitting and/or receiving information or data, those of ordinary skill in the pertinent arts will recognize that the aerial vehicle 210 may include any number of transceivers, or, alternatively or additionally, any number of transmitting and/or receiving devices that may be provided as discrete components.

The control system 220 may include one or more electronic speed controls, power supplies, navigation systems and/or payload engagement controllers for controlling the operation of the aerial vehicle 210 and for engaging with or releasing items (not shown), as desired. For example, the control system 220 may be configured to cause or control the operation of one or more aspects of the aerial vehicle 210, such as to cause one or more of the propulsion motors 230 or the control surfaces 235 to guide the aerial vehicle 210 along a determined or desired flight path, or to perform any other function. The control system 220 may also be configured to cause or control the operation of the one or more sensors, which may include but are not limited to the imaging devices 250-1 . . . 250-n as well as any acoustic sensors, light sensors, or any other type or form of environmental and/or operational sensors (not shown). The control system 220 may further control other aspects of the aerial vehicle 210, including but not limited to the engagement with or release of one or more items by one or more engagement systems (not shown). In some embodiments, the control system 220 may be integrated with one or more of the processors 212, the memory components 214 and/or the transceivers 216.

The propulsion motors 230 may be any motors or other systems (e.g., electric, gasoline-powered or any other motor) that may be joined to an airframe of the aerial vehicle 210 and are capable of generating sufficient rotational speeds of corresponding propellers or other components to provide lift and/or thrust forces to the aerial vehicle 210 and any payload engaged thereby, such as to aerially transport the engaged payload from one location to another. For example, one or more of the propulsion motors 230 may be a brushless direct current (DC) motor such as an outrunner brushless motor or an inrunner brushless motor. Additionally, the propulsion motors 230 may be of any kind, and may be dedicated to one or more purposes or functions. For example, one or more of the propulsion motors 230 may be aligned or configured to provide forces of lift to the aerial vehicle 210, exclusively, while one or more of the propulsion motors 230 may be aligned or configured to provide forces of thrust to the aerial vehicle 210, exclusively. Alternatively, one or more of the propulsion motors 230 may be aligned or configured to provide forces of lift and/or forces of thrust to the aerial vehicle 210, as needed. For example, such propulsion motors 230 may be fixed in their orientation on the aerial vehicle 210, or configured to vary their respective orientations, e.g., a tilt-rotor aircraft. Moreover, such propulsion motors 230 may be aligned or configured to operate with different capacities or ratings, or at different speeds, or coupled to propellers having different sizes and shapes. Such propulsion motors 230 may be controlled by the processors 212, the control system 220, or any other aspect of the aerial vehicle 210.

Additionally, the propulsion motors 230 of the aerial vehicle 210 may be coupled to one or more propellers, e.g., any rotors or rotatable systems having a plurality of shaped blades joined to a hub or boss. Each of such propellers may be rotatably mounted to a mast or shaft associated with a corresponding one of the propulsion motors 230 and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 212, the control system 220, or any other aspect of the aerial vehicle 210.

The control surfaces 235 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 235 may include, but are not limited to, ailerons, brakes, elevators, elevons, flaps, rudders, slats, tailerons or wings, or other features. In some embodiments, each of the control surfaces 235 may include a motor, such as an electrical, mechanical and/or hydraulic or other component or actuator for rotating, translating or otherwise repositioning or reorienting a respective one of the control surfaces 235 during operation of the aerial vehicle 210, under the control of the one or more processors 212 or the control system 220. In some embodiments, each of the control surfaces 235 may include a directional sensor, such as any type of sensor or other component that is embedded into one or more aspects of one of the control surfaces 235 (e.g., a leading edge, a trailing edge, a tip or one or more other faces or aspects of such surfaces 235) and configured to gather information or data with respect to an alignment or orientation thereof. For example, one of the control surfaces 235 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction. The aerial vehicle 210 may further include any number of additional fixed or mobile components or features, including but not limited to actuators, brackets, fuselages, junctions, landing gear, struts, or other components or features, which may be mounted to component parts of a frame, or to one or more component parts mounted to the frame.

The propulsion motors 230 and/or the control surfaces 235, or any other components of the aerial vehicle 210, may be coupled to a frame or other structure or surface of the aerial vehicle 210, or to any other object, by one or more joints or junctions (or other connectors or connections). Such joints or junctions may be defined or formed in any manner and by any components or techniques including but not limited to nuts and/or bolts, clips, rivets, fasteners, adhesives or welds.

The aerial vehicle 210 may further include one or more inertial measurement units or systems (not shown) that are configured to sense changes in linear or rotational motion of the aerial vehicle 210. Such units or systems may include one or more gyroscopes, one or more accelerometers, one or more compasses (or other magnetometer) and/or one or more Global Positioning System ("GPS") transceivers.

The imaging devices 250-1 . . . 250-$n$ may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging devices 250-1 . . . 250-$n$ may include one or more processors 252-1 . . . 252-$n$, one or more memory or storage components 254-1 . . . 254-$n$, and one or more image sensors 256-1 . . . 256-$n$, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). Such imaging devices 250-1 . . . 250-$n$ may capture imaging data in the form of one or more still or moving images of any kind or form, as well as any relevant audio signals or other information during the operation of the aerial vehicle 210.

In some embodiments, the imaging devices 250-1 . . . 250-$n$ and/or the processors 252-1 . . . 252-$n$ may be configured to execute any functions or perform any tasks associated with imaging data. For example, in some embodiments, the imaging devices 250-1 . . . 250-$n$ and/or the processors 252-1 . . . 252-$n$ may perform one or more affine transformations such as a translation, a scaling, a shearing and/or a rotation, one or more perspective transformations, one or more global or local transformations, or another geometric transform function, e.g., linear or non-linear transformations, to identify corresponding pixels within image frames. Likewise, in some embodiments, the imaging devices 250-1 . . . 250-$n$ and/or the processors 252-1 . . . 252-$n$ may execute any type or form of color transform function, e.g., color matching, histogram stretching, histogram equalization, contrast stretching, range expansion or any other technique, such as normalization, regularization or filtering. The types of functions or tasks that may be completed by the imaging devices 250-1 . . . 250-$n$ and/or the processors 252-1 . . . 252-$n$ are not limited.

The imaging devices 250-1 . . . 250-$n$ may be mounted, fixed, embedded or otherwise joined to one or more external surfaces of the aerial vehicle 210 in any manner and in any orientation or alignment to capture imaging data from above the aerial vehicle 210. For example, one or more of the imaging devices 250-1 . . . 250-$n$ may be coupled to any form of support system or structure for maintaining the lenses or other optical elements of the imaging devices 250-1 . . . 250-$n$ at a selected orientation or configuration. Alternatively, the imaging devices 250-1 . . . 250-$n$ may be mounted, fixed, embedded or otherwise joined to external surfaces of the aerial vehicle 210 in any other manner.

The imaging devices 250-1 . . . 250-$n$ may communicate with the processor 212 and/or the control system 220, or with one another, by way of a wired or wireless connection that may be dedicated or comprise all or part of an internal network (not shown), e.g., an internal communications bus. Additionally, the imaging devices 250-1 . . . 250-$n$ may be adapted or otherwise configured to communicate with the data processing system 280 by way of the network 290. Any number or type of imaging devices 250-1 . . . 250-$n$ may be provided aboard the aerial vehicle 210 in accordance with the present disclosure, including but not limited to digital cameras, depth sensors or range cameras, infrared cameras, radiographic cameras or other optical sensors.

Moreover, the imaging devices 250-1 . . . 250-$n$ may also include manual or automatic features for modifying a position, field of view or orientation of the imaging devices 250-1 . . . 250-$n$. For example, a digital camera may be configured in a fixed position, or with a fixed focal length (e.g., fixed-focus lenses) or angular orientation. Alternatively, the imaging devices 250-1 . . . 250-$n$ may include one or more actuated or motorized features for adjusting a position of the imaging devices 250-1 . . . 250-$n$, or for adjusting either the focal length (e.g., zooming the imaging devices 250-1 . . . 250-$n$) or the angular orientation (e.g., the roll angle, the pitch angle or the yaw angle), by causing a change in the distance between the sensor and the lens (e.g., optical zoom lenses or digital zoom lenses), a change in the location of the imaging devices 250-1 . . . 250-*n*, or a change in one or more of the angles defining the angular orientation.

For example, the imaging devices 250-1 . . . 250-*n* may be hard-mounted to a support or mounting that maintains the devices 250-1 . . . 250-*n* in a fixed configuration or angle with respect to one, two or three axes. Alternatively, however, the imaging devices 250-1 . . . 250-*n* may be provided with one or more motors and/or controllers for manually or automatically operating one or more of the components, or for reorienting a position, axis or direction of the imaging devices 250-1 . . . 250-*n*, i.e., by moving, panning or tilting the imaging devices 250-1 . . . 250-*n*. Panning the imaging devices 250-1 . . . 250-*n* may cause a rotation within a horizontal plane or about a vertical axis (e.g., a yaw), while tilting the imaging devices 250-1 . . . 250-*n* may cause a rotation within a vertical plane or about a horizontal axis (e.g., a pitch). Additionally, the imaging devices 250-1 . . . 250-*n* may be rolled, or rotated about its axis of rotation, and within a plane that is perpendicular to the axis of rotation and substantially parallel to a field of view of the imaging devices 250-1 . . . 250-*n*. The imaging devices 250-1 . . . 250-*n* may also be provided on a vehicle enabled to pass within an operating range of the aerial vehicle 210.

The imaging devices 250-1 . . . 250-*n* may also digitally or electronically adjust an image identified in a field of view, subject to one or more physical and operational constraints. For example, the imaging devices 250-1 . . . 250-*n* may virtually stretch or condense the pixels of an image in order to focus or broaden the field of view of the imaging devices 250-1 . . . 250-*n*, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

In addition to the imaging devices 250-1 . . . 250-*n*, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, altimeters, thermometers, barometers, hygrometers, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, or sound sensors (e.g., microphones, piezoelectric sensors, vibration sensors or other transducers for detecting and recording acoustic energy from one or more directions).

Although the block diagram of FIG. 2 includes a single box for the processor 212, the memory component 214, the transceiver 216, the control system 220, the propulsion motors 230 or the control surfaces 235, and two boxes for the imaging devices 250-1 . . . 250-*n*, those of ordinary skill in the pertinent arts will recognize that any number or type of such components may be provided aboard the aerial vehicle 210 in accordance with the present disclosure.

The system 200 further includes an imaging device 260 having a processor 262, a memory component 264 and a sensor 266. The imaging device 260 may be mounted external to the aerial vehicle 210, e.g., at not less than a minimum threshold distance therefrom, such as to one or more stanchions or ground-based structures, an aerial vehicle other than the aerial vehicle 210, or a satellite or other system. The imaging device 260 may have any of the same attributes or features of the imaging devices 250-1 . . . 250-*n* described above, while the processor 262, the memory component 264 and/or the sensor 266 may also have any of the same attributes or features of the processors 252-1 . . . 252-*n*, the memory components 254-1 . . . 254-*n* or the sensors 256-1 . . . 256-*n* described above. Alternatively, the imaging device 260 or any of the processor 262, the memory component 264 or the sensor 266 may have any number of attributes or features that are different from attributes or features of the processors 252-1 . . . 252-*n*, the memory components 254-1 . . . 254-*n* or the sensors 256-1 . . . 256-*n* described above.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information regarding operation of the aerial vehicle 210 or, alternatively, provided in connection with one or more other physical or virtual services configured to receive, analyze or store such information or data, as well as one or more other functions. The servers 282 may be connected to or otherwise communicate with the processors 284 and the data stores 286, which may store any type of information or data, for any purpose. The servers 282 and/or the computer processors 284 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., imaging data captured by the imaging devices 250-1 . . . 250-*n* or the imaging device 260, positions of the aerial vehicle 210, or related information or data received from the aerial vehicle 210, or from one another, or from one or more other external computer systems (not shown) via the network 290. In some embodiments, the data processing system 280 may be provided in a physical location, or in one or more alternate or virtual locations, e.g., in a "cloud"-based environment. In still other embodiments, one or more components of the data processing system 280 may be provided onboard one or more aerial vehicles, including but not limited to the aerial vehicle 210.

Any of the functions or processed described herein as being performed, or capable of being performed, by one of the processor 212 or the server 282, or any other components, may be performed by any or all of the processor 212 or the server 282, or by any other components. For example, the detection of one or more objects within images or image planes, the generation of vectors or bearing between imaging sensors or other components of the imaging devices 250-1 . . . 250-*n* or the imaging device 260 and such objects or locations of such objects within image planes, or the determination of vectors or headings associated with an orientation of the aerial vehicle 210, or any other operations described herein, may be performed by any or all of the processor 212 or the server 282.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212, the control system 220 or the processor 284, or any other computers or control systems utilized by the aerial vehicle 210 or the data processing system 280 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
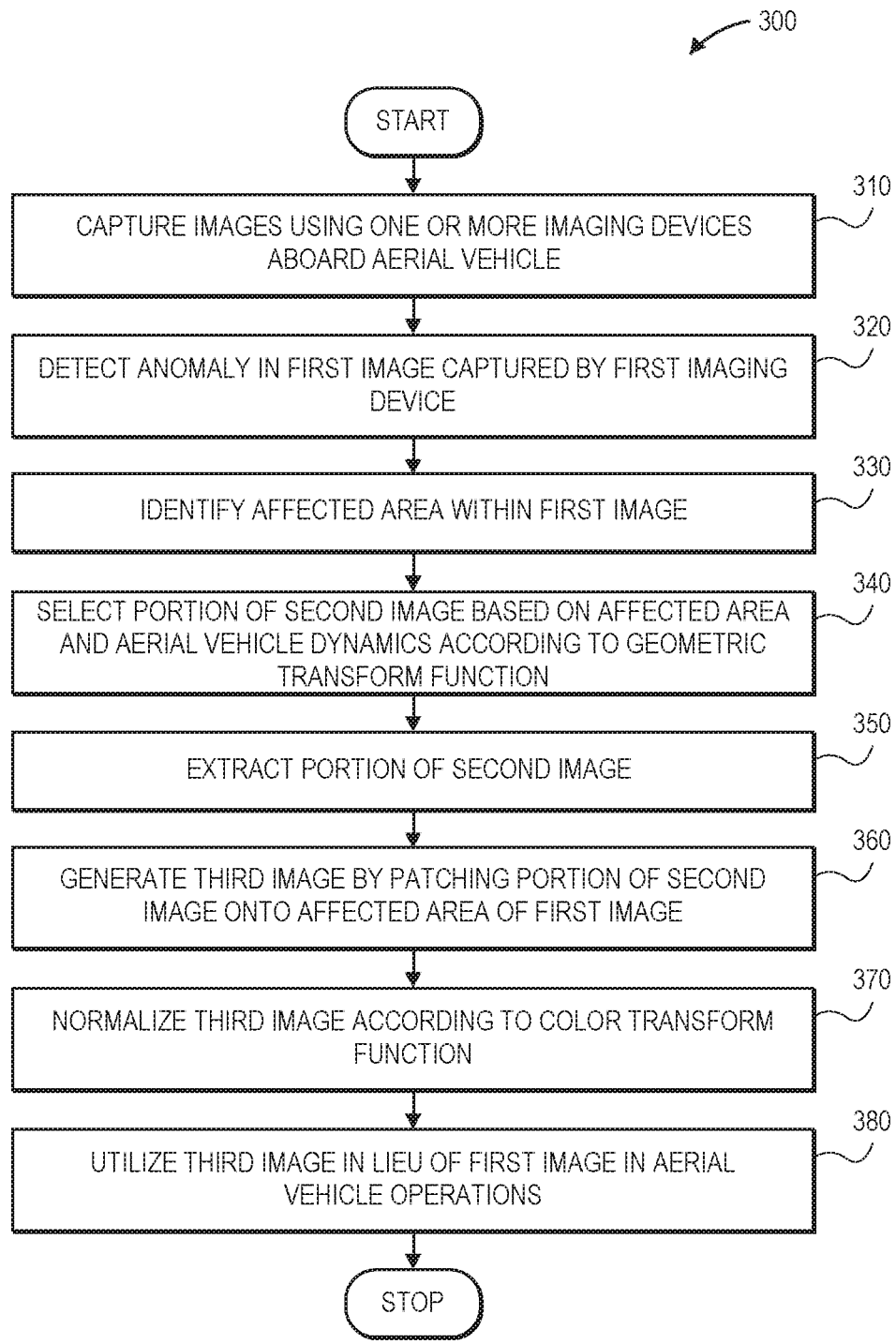
FIG. 3 is a flow chart of one process for inpainting image feeds of operating vehicles in accordance with embodiments of the present disclosure.

Referring to FIG. 3, a flow chart 300 of one process for inpainting image feeds of operating vehicles in accordance with embodiments of the present disclosure is shown.

At box 310, images are captured using one or more imaging devices provided aboard an operating aerial vehicle. The images may be provided at any angle with respect to the aerial vehicle, and provided for any purpose, such as computer vision applications, navigation, guidance, or collision avoidance. For example, the imaging devices may have axes of orientation that are fixed or mobile, or are aligned at any angle with respect to one or more principal axes of the aerial vehicle. The images may be captured by a single imaging device provided aboard the aerial vehicle, or by two or more imaging devices, such as where the imaging devices are component parts of a stereo rig or other stereo ranging system. Alternatively, the imaging devices may be provided aboard any other type of vehicle, including but not limited to a manned or an autonomous ground vehicle, such as an automobile or robot.

At box 320, an anomaly is detected in a first image captured by a first imaging device. Such anomalies may adversely impact the quality of the images or other imaging data that may be captured thereby, and may occur at random or as a result of intentional or unintentional events occurring within a vicinity of the first imaging device. For example, an improperly installed or aligned device may capture images that are blurred or out-of-focus, e.g., a failure to properly monitor or adjust the focus of the camera during or following installation. Moreover, even a properly installed or aligned imaging device may drift out-of-focus due to any mechanical vibrations that may be encountered during operation. An unintentional or unanticipated adjustment of one or more components of the imaging device may cause blurry or marred aspects within the field of view to drift or grow over time. Moreover, depending on the conditions in which the first aerial vehicle is deployed, the lenses or other equipment may be impacted by dust, moisture or other airborne impurities, subject to adverse lighting conditions, or marred by fingerprints, smudges or other like impediments. The first imaging device may also be subject to long-term degradation of sensors or other optical equipment due to incident sunlight, reflections, bright spots or specularities, thereby saturating the sensors and causing glares in images captured thereby.

In some embodiments, anomalies may be identified and assessed by one or more statistical methods or means, such as by training a machine learning system or classifier, e.g., a support vector machine, a linear regression model, K-means clustering techniques, nearest neighbor analyses or an artificial neural network. The machine learning system or classifier may be trained using statistical descriptors that are derived from low-level image or pixel statistics obtained from images or imaging data and provided to the machine learning system or classifier in association with imaging device anomalies.

Any number of statistical descriptors may be provided to a machine learning system or classifier in accordance with the present disclosure. For example, a variance of absolute values of a Laplacian operator, e.g., a two-dimensional isotropic measure of a second spatial derivative of an image, may be used to calculate a descriptor based on second-order derivatives to capture high spatial frequencies, such as those that may be associated with sharp edges or features of an image. Likewise, an image may be convolved using a Laplacian operator, and a descriptor may be calculated based on a sum of the resultant absolute values over a window of defined pixel dimensions. A Tenengrad descriptor may be based on a local sum of a square of gradients, and may use a Sobel operator to determine strengths of horizontal and vertical gradients. Such a descriptor may also be formulated as a sum of gradient magnitudes that exceed a predetermined acuity threshold. Further, a modified Tenengrad descriptor may consider a variance of the sum of squares of Sobel gradients, thereby defining a more discriminative measure while increasing a level of responsiveness to noise. Anomalies such as sensor saturation, blurring, blooming or overexposure may lead to a reduction in modified Tenengrad values.

Descriptors may also be calculated based on variances of pixel values over an entire image, which decrease as blurriness in an image decreases, or as edges or sharp features are smoothed, or pixel contrasts, e.g., differences between a pixel and each of its neighbors, as summed over an entire image, which may be used to detect low-clarity images due to layers of dust, water, fingerprints or other impurities on a lens. Descriptors may be further calculated as ratios between energies of high-pass bands and low-pass bands of energy extracted from an image, e.g., Chebyshev moments of a normalized image, which may be used to accurately reconstruct intensity distributions, as well as histogram entropy, or measures of information content of all pixels of an image, with low probabilities of occurrence contributing to high entropies and vice versa. Because sharper images, as well as images that are captured using clean lenses or unoccluded images, typically contain widely varying numbers of pixel values, the pixels of such images have statistically lower probabilities of occurrence, and higher levels of entropy.

The various descriptors identified above, or other descriptors, may be calculated relatively quickly and efficiently for each image or set of imaging data captured by an imaging device, with the objective of determining whether the imaging device is experiencing any anomalies, e.g., an anomaly status of the imaging device, and, if so, which anomaly is being experienced. A machine learning system or classifier may be provided with a training set comprising a variety of images or sets of imaging data obtained from anomaly-free imaging devices, and a variety of images or sets of imaging data obtained from imaging devices experiencing one or more anomalies. Where an image or set of imaging data is obtained from an imaging device experiencing an anomaly, the images or the set of imaging data may be labeled with the type or category of the anomaly, e.g., cracked lenses, improper alignments or orientations, specularities, motor failures, moisture, dirt or other debris, fouling on a lens, poor focusing or the like. Additionally, prior to commencing a training session, a subset of the training set, or a test set of images or imaging data, may be set aside and used to evaluate the efficacy of the training session.

At box 330, an affected area within the first image is identified. For example, the first image may include pixels that are unreadable or are inconsistent with colors or textures of surrounding pixels within the first image, or color or textures of corresponding pixels within other images previously captured by the first imaging device or one or more other imaging devices. Where the affected area of the first image is a result of a permanent or a temporary anomaly of the first imaging device, a similar affected area will appear in images subsequently captured by the first imaging device until the anomaly is removed, e.g., by cleaning, repairing or replacing a lens, a sensor or any other component of the first imaging device.

At box 340, a portion of a second image is selected based on the affected area and aerial vehicle dynamics according to a geometric transform function. For example, a portion of the second image depicting background features, foreground features or other aspects that would also have been present within the affected area of the first image had the first imaging device not experienced the anomaly, or are depicted within or near pixels of the affected area, may be identified in any manner. In some embodiments, a geometric transform function may be generated for each pixel of an image plane of an imaging device, and used to identify pixels of other images, e.g., counterpart images, depicting content similar or identical to that which is depicted by the imaging device at such pixels. The geometric transform function may consider a velocity or an altitude of the aerial vehicle, as well as one or more attributes of a pose of the first imaging device (e.g., an axis of orientation, a focal length, an aperture width, a depth of field or a field of view), or any other factors. Moreover, the portion of the second image may be selected using one or more masks or other image processing settings or features.

In some embodiments, the second image may have been captured by a second imaging device provided aboard the aerial vehicle, e.g., another imaging device provided in a common stereo rig with the first imaging device, or in any other location on the imaging device, and having a field of view overlapping a field of view of the first imaging device at least in part. In some other embodiments, the second image may have been captured using a second imaging device that is provided elsewhere, e.g., not aboard the aerial vehicle. For example, the second imaging device may be provided aboard a different aircraft or spacecraft, e.g., another aerial vehicle or an orbiting satellite, or aboard a ground-based structure, and may be configured to capture imaging data from the same scene as the first imaging device at approximately the same time that the first image was captured or at one or more other times. Alternatively, the second imaging device may be provided in one or more fixed or mobile locations. In still other embodiments, the second image may have been captured by the first imaging device, prior to the capture of the first image. The portion of the second image may be selected based on a difference in time between the capture of the first image and the capture of the second image.

At box 350, the portion of the second image selected at box 340 is extracted therefrom, e.g., by copying the portion of the second image, by determining values of colors or intensities of pixels or groups of pixels in the portion of the second image, such as according to the RGB or a hexadecimal model, or in any other manner. At box 360, a third image is generated by patching the portion of the second image extracted at box 350 onto the affected area of the first image. The third image may be generated in any manner, such as by inpainting, patching or superimposing the portion of the second image onto the affected area of the third image.

At box 370, the third image is normalized or otherwise standardized according to a color transform function, such as by color matching, histogram stretching, histogram equalization, contrast stretching, range expansion or any other technique, such as normalization, regularization or filtering. Alternatively, or additionally, the third image may be regularized according to a color transform function.

At box 380, the third image is utilized in lieu of the first image in one or more aerial vehicle operations, and the process ends. For example, the third image may be provided to an image detection algorithm, a stereo ranging algorithm, a computer vision algorithm, or to any other algorithm, system or technique.

As is discussed above, where an image is determined to have been captured using an imaging device that is experiencing an anomaly, a counterpart image from which a portion may be extracted and applied to an affected area of that image may be obtained from any number of sources. Referring to FIGS. 4A through 4D, views of aspects of one system for inpainting image feeds of operating vehicles in accordance with embodiments of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1G.

Figure 4A:
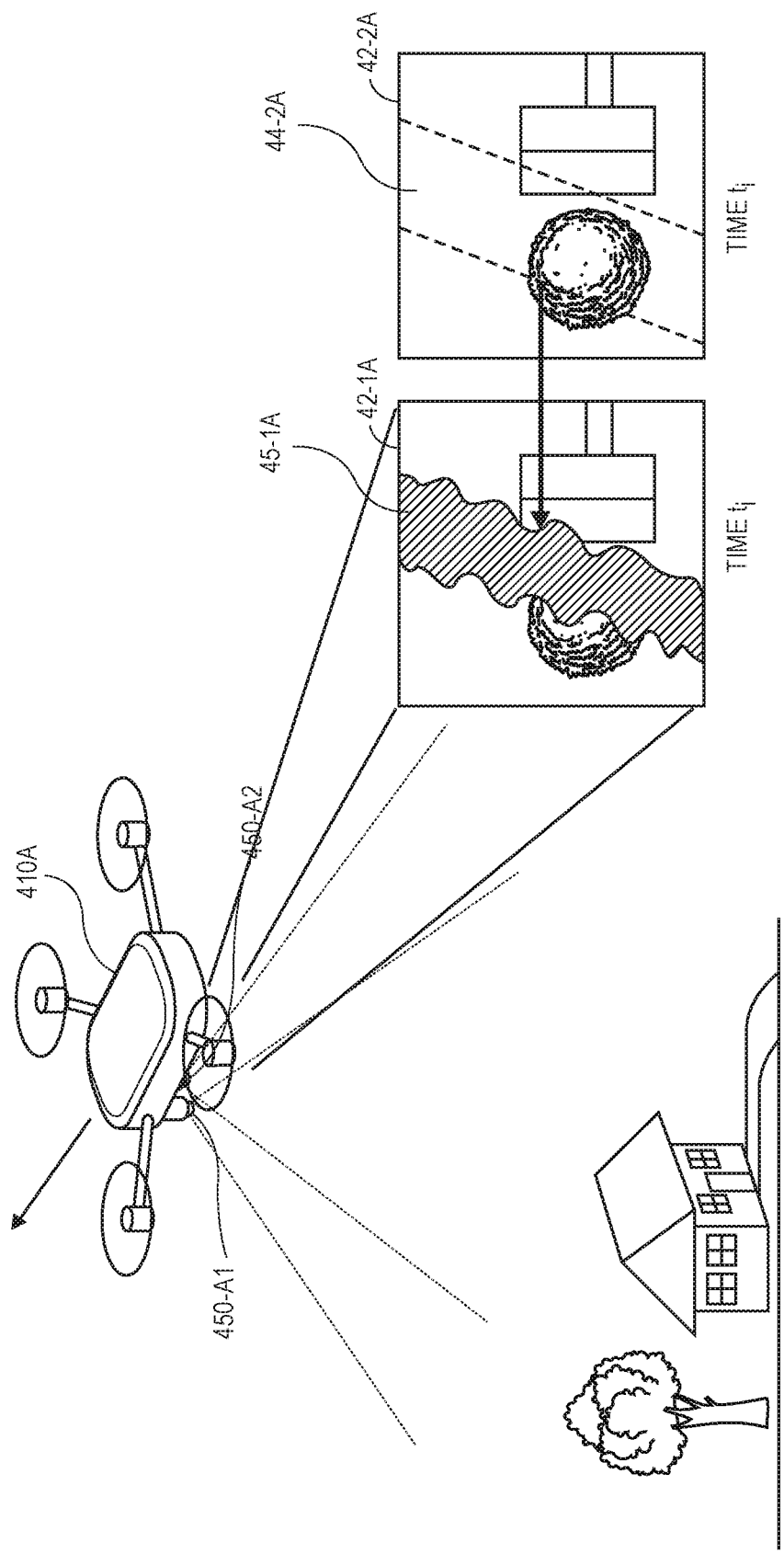

As is shown in FIG. 4A, an aerial vehicle 410A includes a pair of imaging devices 450-A1, 450-A2 that are configured to capture imaging data during airborne operations. For example, the imaging devices 450-A1, 450-A2 may be independently mounted to an underside of the aerial vehicle 410A, or component parts of a stereo rig mounted to the aerial vehicle 410A, and oriented or configured for orientation in a substantially vertically downward alignment with respect to the principal axes of the aerial vehicle 410A. The imaging devices 450-A1, 450-A2 are configured to capture imaging data in tandem, e.g., substantially simultaneously, such as for use in conducting ranging operations or determining altitudes above or distances to ground surfaces beneath the aerial vehicle 410A while the aerial vehicle 410A is in flight.

As is also shown in FIG. 4A, an image 42-1A of a scene beneath the aerial vehicle 410A is captured by the imaging device 450-1A at a time $t_1$, and an image 42-2A of the same scene is captured using the imaging device 450-2A at the time $t_1$. The imaging device 450-1A is determined to be experiencing one or more anomalies, e.g., cracked lenses, improper alignments or orientations, specularities, motor failures, moisture, dirt or other debris, or fouling, based on the presence of an affected area 45-1A within the image 42-1A. The affected area 45-1A may be detected within the image 42-1A on any basis and according to any technique. Additionally, as is also shown in FIG. 4A, the imaging device 450-2A is not experiencing any anomalies based on the absence of any affected areas within the image 42-2A.

Because the imaging device 450-1A and the imaging device 450-2A are component parts of a stereo pair, and are capturing imaging data substantially simultaneously, e.g., at the time $t_1$, images captured by the imaging device 450-1A may act as counterpart images for images captured by the imaging device 450-2A. A portion 44-2A of the image 42-2A that corresponds to the affected area 45-1A may be selected in any manner or on any basis, such as by one or more transform functions associated with the imaging device 450-1A or the image 42-1A. A modified image (not shown) may be generated by patching the portion 44-2A onto the affected area 45-1A of the image 42-1A, or by combining the portion 44-2A with a balance of the image 42-1A, according to any inpainting, patching, superimposing or other techniques.

Figure 4B:
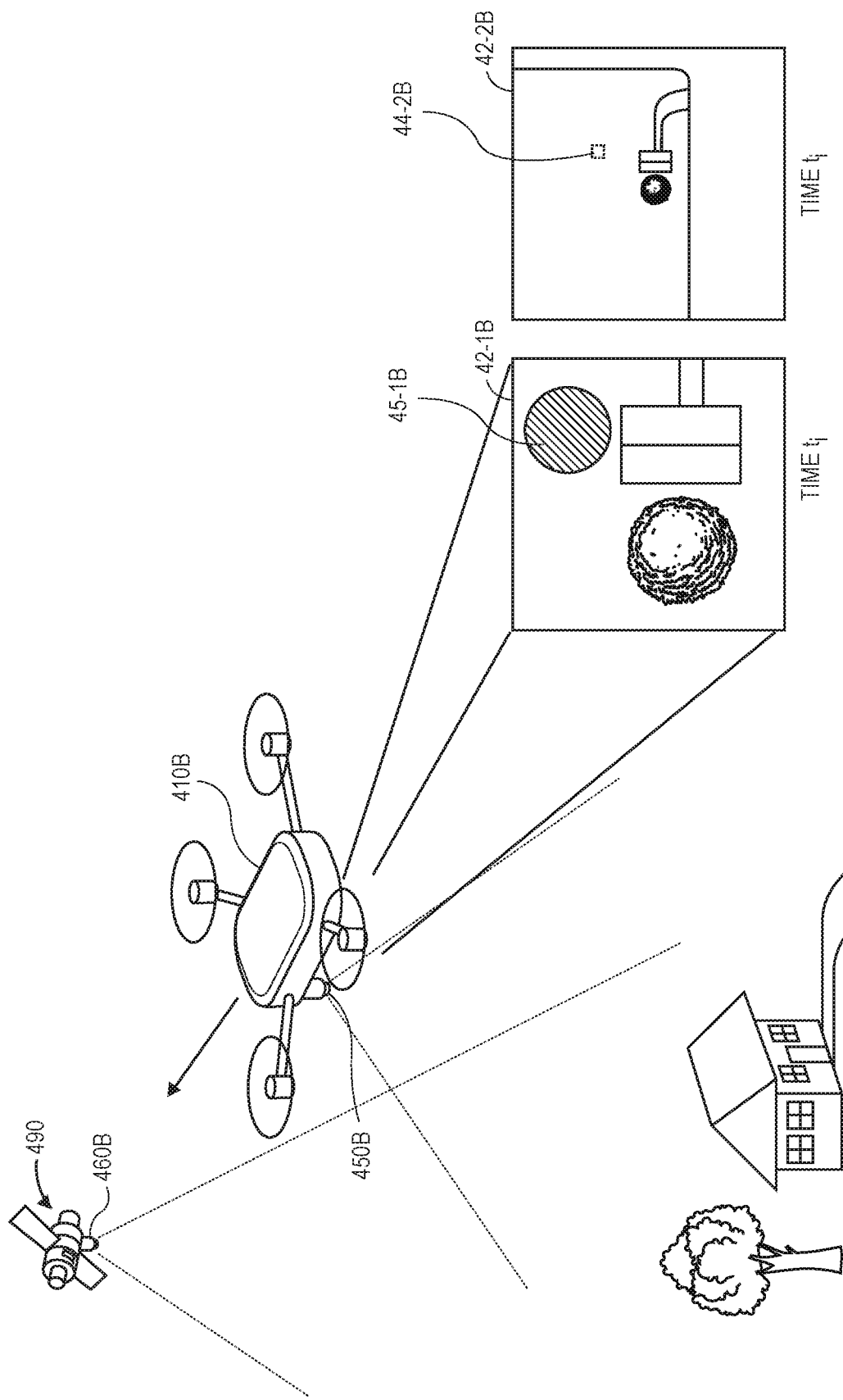

As is shown in FIG. 4B, an aerial vehicle 410B includes an imaging device 450B that is configured to capture imaging data during airborne operations. The imaging device 450B is mounted to an underside of the aerial vehicle 410B, and oriented or configured for orientation in a substantially vertically downward alignment with respect to the principal axes of the aerial vehicle 410B.

As is also shown in FIG. 4B, an image 42-1B of a scene beneath the aerial vehicle 410B is captured by the imaging device 450B at a time $t_1$. The imaging device 450B is determined to be experiencing one or more anomalies, e.g., cracked lenses, improper alignments or orientations, specularities, motor failures, moisture, dirt or other debris, or fouling, based on the presence of an affected area 45-1B within the image 42-1B. The affected area 45-1B may be detected within the image 42-1B on any basis and according to any technique.

Images of the scene beneath the aerial vehicle 410B that were captured by imaging devices not provided aboard the aerial vehicle 410B at or approximately the time $t_1$ may act as counterpart images for the image 42-1B. For example, as is shown in FIG. 4B, an image 42-2B captured using an imaging device 460B provided aboard an orbiting satellite 490 at approximately the time $t_1$ indicates that the imaging device 460B is not experiencing any anomalies, based on the absence of any affected areas within the image 42-2B. As is shown in FIG. 4B, a portion 44-2B of the image 42-2B that corresponds to the affected area 45-1B may be selected in any manner or on any basis, such as by one or more transform functions associated with the imaging device 450B or the image 42-1B. A modified image (not shown) may be generated by patching the portion 44-2B onto the affected area 45-1B of the image 42-1B or by combining the portion 44-2B with a balance of the image 42-1B, according to any inpainting or other techniques.

Figure 4C:
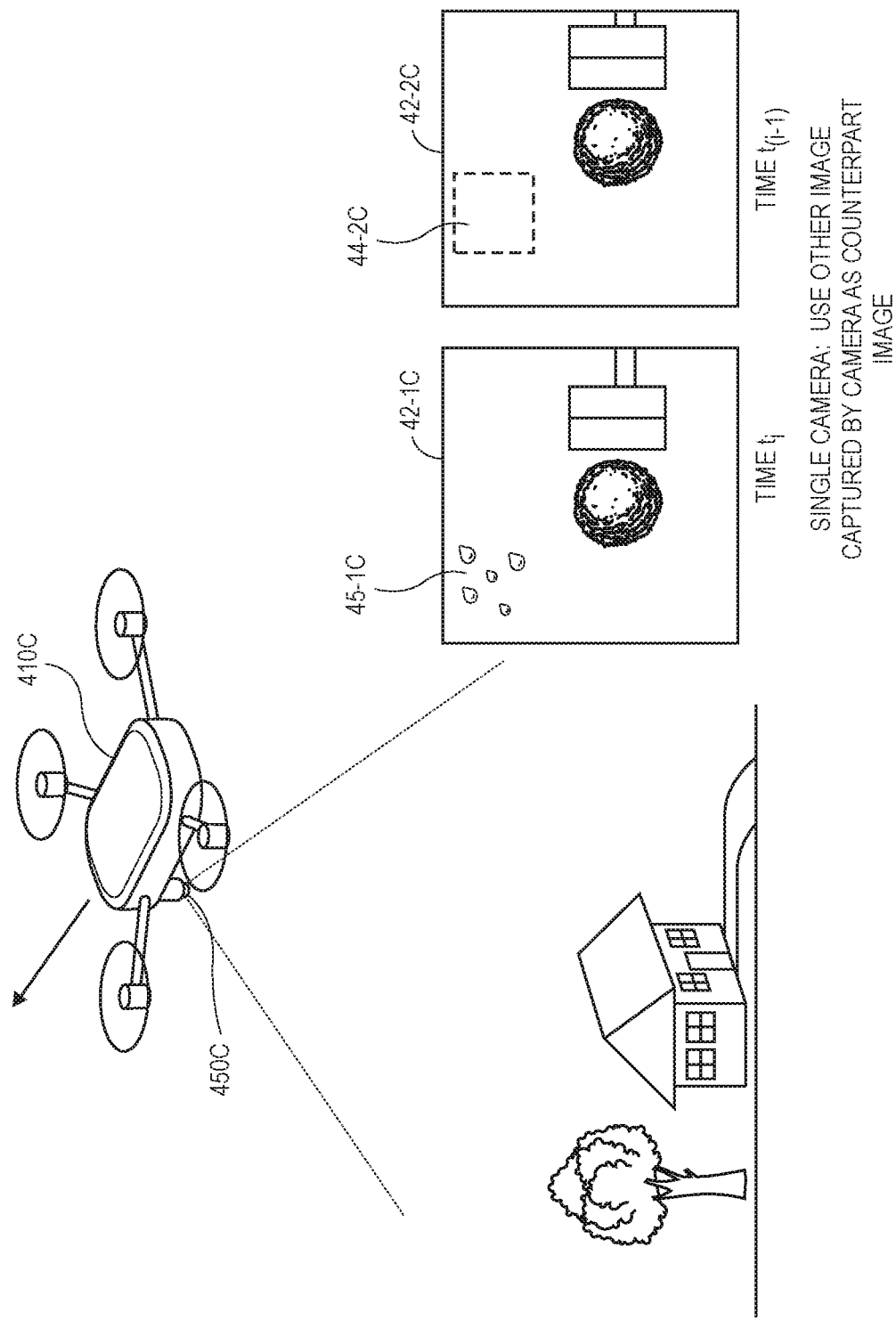

As is shown in FIG. 4C, an aerial vehicle 410C includes an imaging device 450C that is configured to capture imaging data during airborne operations. The imaging device 450C is mounted to an underside of the aerial vehicle 410C, and oriented or configured for orientation in a substantially vertically downward alignment with respect to the principal axes of the aerial vehicle 410C.

As is also shown in FIG. 4C, an image 42-1C of a scene beneath the aerial vehicle 410C is captured by the imaging device 450C at a time $t_1$. The imaging device 450C is determined to be experiencing one or more anomalies, e.g., moisture on a lens, or, alternatively, cracked lenses, improper alignments or orientations, specularities, motor failures, moisture, dirt or other debris, or fouling, at the time $t_1$ based on the presence of an affected area 45-1C within the image 42-1C. The affected area 45-1C may be detected within the image 42-1C on any basis and according to any technique.

Images of the scene beneath the aerial vehicle 410C that were captured by the aerial vehicle 410C at or approximately the time $t_1$ may act as counterpart images for the image 42-1C. For example, as is shown in FIG. 4C, an image 42-2C captured using the imaging device 450C prior to the time $t_1$ (viz., the time $t_{(i-1)}$) indicates that the imaging device 450-2C was not experiencing any anomalies, based on the absence of any affected areas within the image 42-2C. As is shown in FIG. 4C, a portion 44-2C of the image 42-2C that corresponds to the affected area 45-1C may be selected in any manner or on any basis, such as by one or more transform functions associated with the imaging device 450-1C or the image 42-1C. A modified image (not shown) may be generated by patching the portion 44-2C onto the image 42-1C, or by combining the portion 44-2C with a balance of the image 42-1C, according to any inpainting or other techniques.

As is shown in FIG. 4D, an aerial vehicle 410D includes an imaging device 450D that is configured to capture imaging data during airborne operations. The imaging device 450D is mounted to an underside of the aerial vehicle 410D, and oriented or configured for orientation in a substantially vertically downward alignment with respect to the principal axes of the aerial vehicle 410D.

As is also shown in FIG. 4D, an image 42-D of a scene beneath the aerial vehicle 410D is captured by the imaging device 450D. The imaging device 450D is determined to be experiencing one or more anomalies, e.g., cracked lenses, improper alignments or orientations, specularities, motor failures, moisture, dirt or other debris, or fouling, based on the presence of an affected area 45-D within the image 42-D. The affected area 45-D may be detected within the image 42-D on any basis and according to any technique.

Portions 44-D of the image 42-D of the scene beneath the aerial vehicle 410D that do not correspond to the affected area 45-D may be selected in any manner or on any basis, such as by one or more transform functions associated with the imaging device 450D or the image 42-D. A modified image (not shown) may be generated by patching one or more of the portions 44-D onto the affected area 45-D, according to any inpainting or other techniques.

Figure 5A:
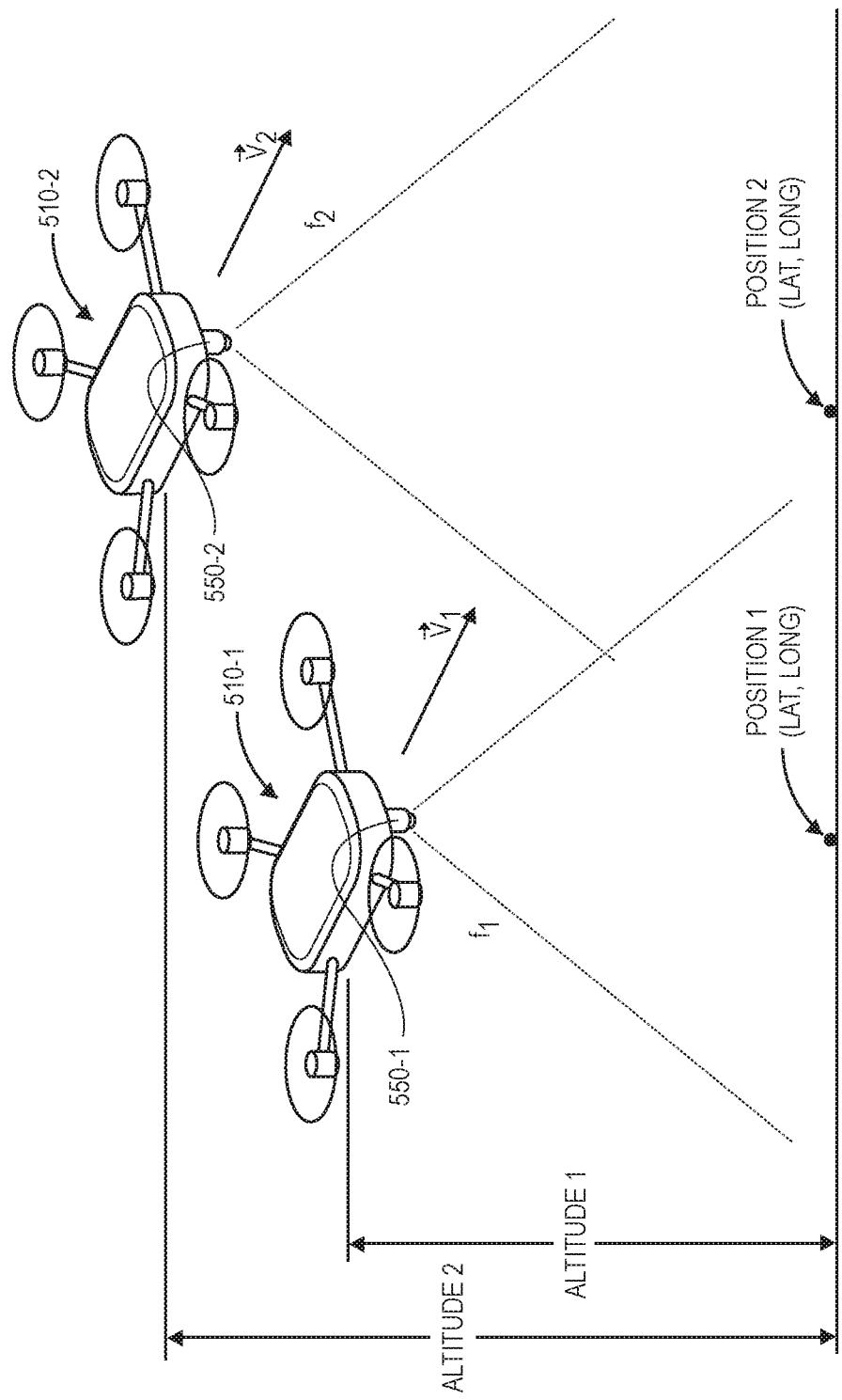
FIGS. 5A and 5B are views of aspects of one system for inpainting image feeds of operating vehicles in accordance with embodiments of the present disclosure.
Figure 5B:
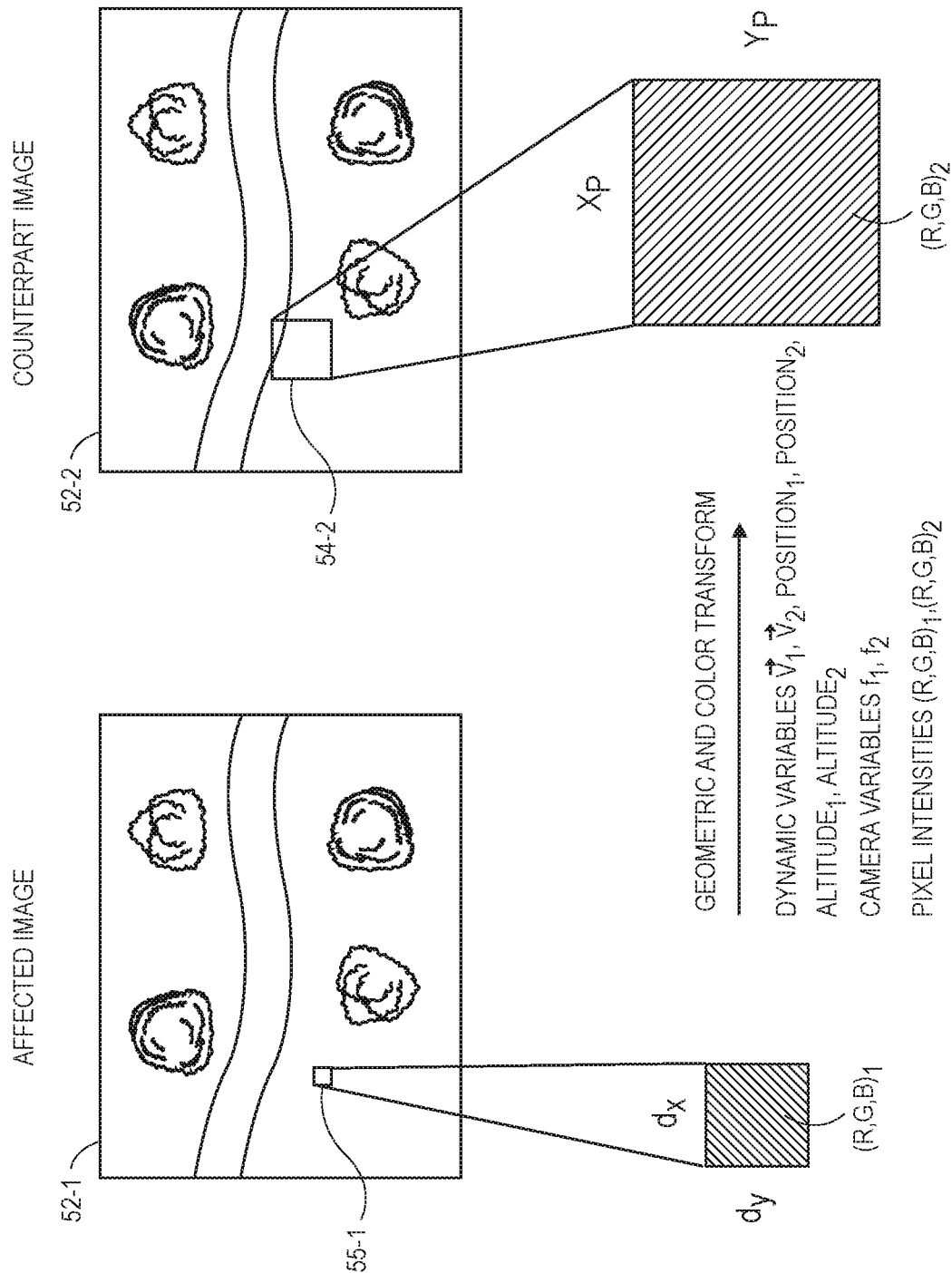

As is discussed above, a geometric transform function for selecting portions of a counterpart image that may be used for patching onto or otherwise combining with another image captured by an imaging device that is experiencing one or more anomalies may take into account one or more factors regarding dynamics of the aerial vehicle, e.g., a velocity, an altitude or an orientation of the aerial vehicle, as well as one or more attributes of an imaging device that was experiencing the anomaly. A color transform function may also be applied to an image that has been modified to incorporate a portion of another image therein, e.g., by inpainting, patching or superimposing, and may be configured or programmed to match pixel intensities or other features of unaffected portions of one image to portions of another image that are selected, e.g., by a geometric transform function, for inpainting, patching or superimposing onto affected portions of the image. Referring to FIGS. 5A and 5B, views of aspects of one system for inpainting image feeds of operating vehicles in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4D, by the number "2" shown in FIG. 2 or by the number "1" shown in FIGS. 1A through 1G.

As is shown in FIG. 5A, an aerial vehicle 510-1 traveling at a velocity $V_1$ includes an imaging device 550-1 that is oriented vertically downward with respect to one or more principal axes of the aerial vehicle 510-1, and is configured at a focal length $f_1$. Likewise, an aerial vehicle 510-2 traveling at a velocity $V_2$ includes an imaging device 550-2 that is oriented vertically downward with respect to one or more principal axes of the aerial vehicle 510-2, and is configured at a focal length $f_2$.

As is shown in FIG. 5B, a transform function of an affected image 52-1 captured by the imaging device 550-1 may be generated for each of the pixels of an image plane of the imaging device 550-1 or of the affected image 52-1. In particular, for a given affected pixel 55-1 of the image 52-1 having dimensions dx, dy, a geometric transform function may be generated for identifying a region 54-2 of pixels having dimensions $x_P$, $y_P$ of a counterpart image 52-2 captured by the imaging device 550-2. The geometric transform function may take into account any factor regarding the operation of the aerial vehicles 510-1, 510-2 at a time that the affected image 52-1 and the counterpart image 52-2 were captured, including dynamic variables such as the velocity V, a latitude, a longitude, and an altitude of the aerial vehicles 510-1, 510-2. Alternatively, any other dynamic variables regarding the operation of the aerial vehicles 510-1, 510-2, including but not limited to an orientation of the aerial vehicles 510-1, 510-2 (e.g., a yaw angle, a pitch angle or a roll angle) may also be considered. Likewise, the geometric transform function may take into account attributes of the imaging device 550-1 that captured the affected image 52-1, or the imaging device 550-2 that captured the counterpart image 52-2, such as the focal lengths $f_1$, $f_2$. Alternatively, any other attributes of one or both of the imaging devices 550-1, 550-2, including but not limited to the axes of orientation, focal lengths, aperture widths, depths of field or fields of view, may also be considered. Meanwhile, a color transform function may determine the pixel intensities $(R, G, B)_1$ of the affected pixel 55-1, and compare the pixel intensities $(R, G, B)_1$ or other attributes to pixel intensities $(R, G, B)_2$ or other attributes of the region 54-2 of pixels, and modify one or more aspects of affected pixel 55-1, the region 54-2 of pixels or an image formed from affected pixel 55-1 and the region 54-2 of pixels.

Once the region 54-2 of pixels has been selected according to the geometric transform functions, a modified image (not shown) that includes the region 54-2 and the balance of the image 52-1 may be generated accordingly, and utilized for any purpose for which the image 52-1 was captured, e.g., computer vision applications, navigation, guidance or contact avoidance.

As is discussed above, a portion of a counterpart image corresponding to an affected area of another image may be selected using one or more transform functions that take into account one or more various factors regarding the dynamics or other conditions under which the respective images were captured. The efficacy of the transform functions may be determined, and the transform functions may be subsequently modified, based on the quality of the images formed using the portions of the counterpart images identified by the transform functions.

Figure 6:
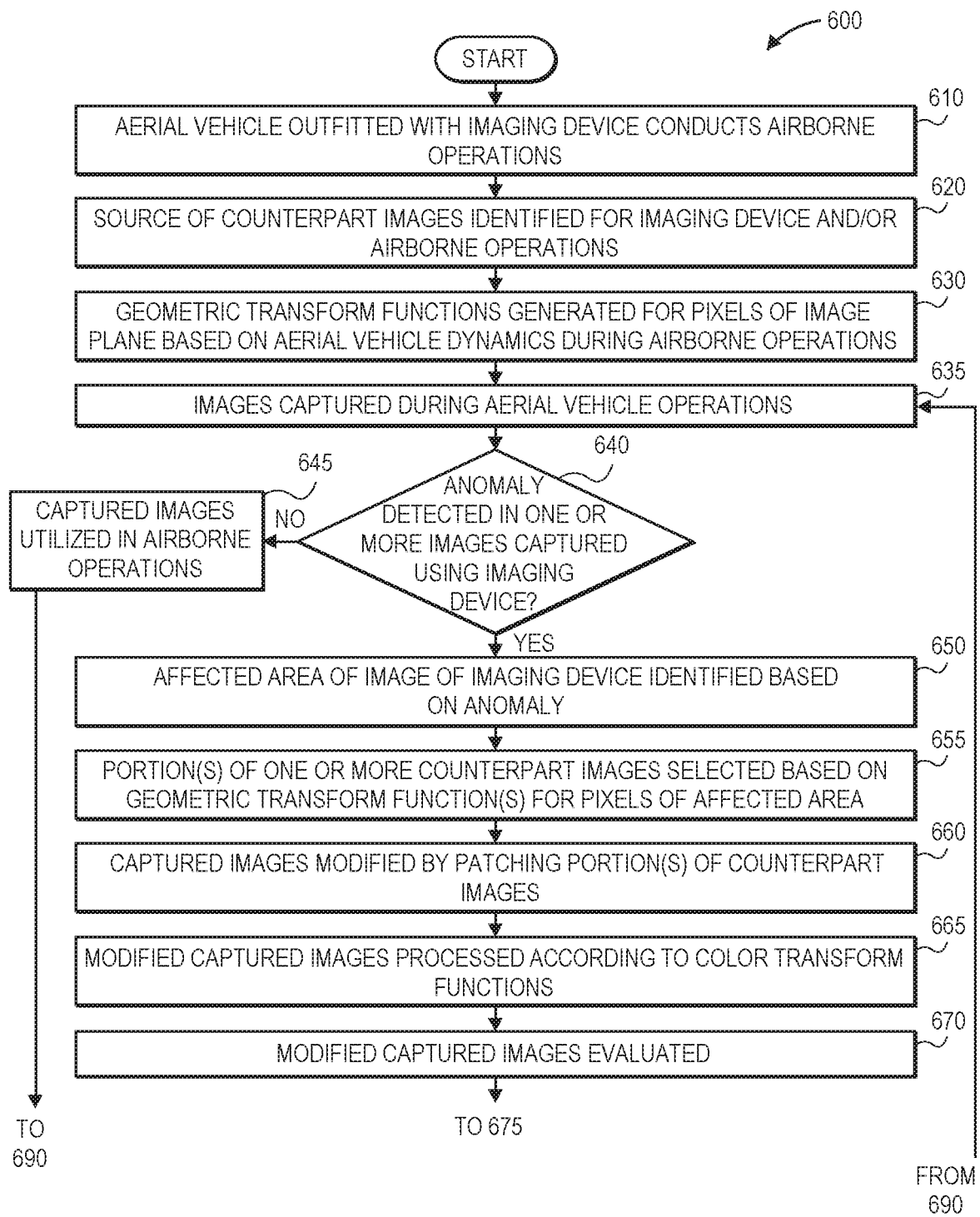
FIG. 6 is a flow chart of one process for inpainting image feeds of operating vehicles in accordance with embodiments of the present disclosure.
Figure 6:
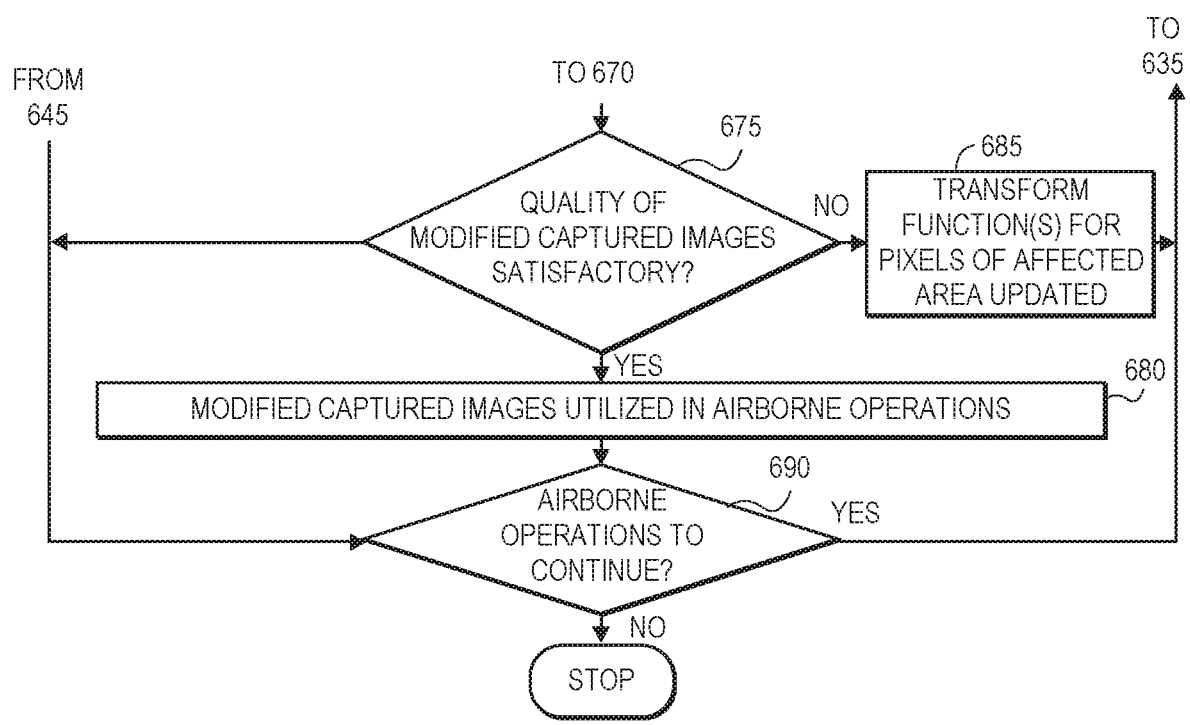

Referring to FIG. 6, a flow chart 600 of one process for inpainting image feeds of operating vehicles in accordance with embodiments of the present disclosure is shown. At box 610, an aerial vehicle outfitted with an imaging device conducts airborne operations. For example, the aerial vehicle may initiate forward flight, vertical flight or hovering operations, at constant or varying altitudes or speeds. In some embodiments, the aerial vehicle may retrieve one or more items at an origin, deliver the one or more items from the origin to a destination, or deposit the one or more items at the destination. Alternatively, the vehicle may be a ground-based vehicle, a seagoing vessel, a hybrid vessel configured for travel on two or more of air, land and sea, or any other vehicle that is configured for manned, human-controlled or autonomous operation in accordance with the present disclosure.

At box 620, a source of counterpart images is identified for the imaging device and/or the airborne operations. For example, the counterpart images may be selected based on a route to be traveled by the aerial vehicle, or velocities or altitudes of the aerial vehicle that are observed or anticipated for the aerial vehicle along the route. In some embodiments, the counterpart images may have been previously captured by one or more imaging devices within a vicinity of the route, including imaging devices provided aboard vehicles or in other locations. Alternatively, the imaging device aboard the aerial vehicle may be a source of the counterpart images. For example, where an anomaly is identified in an image captured by the imaging device, an image previously captured by the imaging device may act as a counterpart image and one or more portions thereof may be applied to affected areas of the image, e.g., by patching, or in any other manner.

At box 630, geometric transform functions are generated for one or more pixels or sets of pixels of an image plane of the imaging device based on the aerial vehicle's dynamics during the airborne operations. For example, a geometric transform function may be used to identify, for a given pixel of an image plane of a first imaging device (or an image captured by the first imaging device), one or more pixels within an image plane of a second imaging device (or an image captured by the second imaging device) that may be used to patch over, replace or otherwise modify images captured using the first imaging device. The geometric transform functions may identify the one or more pixels as functions of an aerial vehicle's dynamics, e.g., velocities, altitudes and/or orientations such as yaw angles, pitch angles or roll angles of the aerial vehicle, as well as one or more attributes of the imaging devices, including their respective axes of orientation, focal lengths, aperture widths, depths of field or fields of view. In some embodiments, the geometric transform function may identify or select an equal number of pixels within a counterpart image to be patched onto, to replace or to otherwise modify a number of pixels of an affected area of another image, e.g., on a one-to-one basis. In some other embodiments, however, any number of pixels (e.g., two or more) of a counterpart image may be identified for use in replacing or otherwise modifying a given pixel of an affected area in another image.

At box 635, one or more images are captured during the airborne operations. The images may be captured at any frame rate, and with the imaging device aligned at any orientation, e.g., vertically, horizontally or at any other angle with respect to the principal axes of the aerial vehicle. Moreover, the images may have been captured for any intended purpose, including but not limited to computer vision applications, navigation, guidance, or collision avoidance.

At box 640, whether an anomaly is detected in one or more of the images captured using the imaging device is determined. Such anomalies may be detected in any manner, including but not limited to statistical methods or means, e.g., based on outputs of one or more machine learning systems or classifiers, or based on determinations or comparisons of local or absolute levels of values of pixels within an image, or in any other manner. Moreover, the anomalies may be the result of cracked lenses, improper alignments or orientations, specularities, motor failures, moisture, dirt or other debris, fouling or from any other source.

If no anomalies are detected in any of the images captured using the imaging device, then the process advances to box 645, where the captured images are used in the airborne operations, e.g., for computer vision applications, navigation, guidance, or collision avoidance, or for any other purpose, and to box 690, where whether the airborne operations of the aerial vehicle are to continue is determined. If the airborne operations are to continue, then the process returns to box 635, where one or more images are captured by the imaging device. If the airborne operations are no longer desired, however, such as where the aerial vehicle has completed a mission or otherwise landed, then the process ends.

If one or more anomalies are detected within the images captured using the imaging device, then the process advances to box 650, where an affected area of an image is identified based on the anomaly. For example, the affected area may manifest itself within imaging data captured using the imaging device in the form of image pixels or values having colors or textures that are different from neighboring image pixels or values, e.g., values of pixels determined according to an RGB or hexadecimal model that are higher or lower than values of nearby or surrounding pixels. Alternatively, in some embodiments, where the imaging device is experiencing specular reflections, the image plane or image pixels within images captured thereby may be saturated or supersaturated.

At box 655, portions of one or more counterpart images are selected based on one or more geometric transform functions for pixels of the affected area of the image plane. The portions may include pixels that correspond to the same foreground or background features that would have appeared clearly within the affected area. Alternatively, or additionally, the portions may include one or more buffers or margins around the pixels corresponding to such foreground or background features. The portions of the counterpart images may be selected using one or more masks or other image processing settings or features.

At box 660, the captured images are modified by patching the portions of the counterpart images thereon or thereto, e.g., on portions of the captured images corresponding to the affected areas of the image planes. For example, the values or the image pixels of the captured images corresponding to the affected area, along with values or images pixels corresponding to a buffer or margin, may be replaced with the portions of the counterpart images selected at box 655.

At box 665, the modified captured images are processed according to one or more color transform functions, such as color matching, histogram stretching, histogram equalization, contrast stretching, range expansion or any other technique, such as normalization, regularization or filtering.

At box 670, the modified captured images are evaluated, for example, to determine whether the selection of the portions of counterpart images based on the geometric transform functions and/or the patching of such portions is adequately performed. The modified captured images may be processed to determine whether any lines or stitching between the portions of the counterpart images and the balance of the captured images are evident, or to otherwise determine whether the modified captured images are adequate for the purposes for which the images were captured.

At box 675, whether the quality of the modified captured images is satisfactory is determined. If the quality of the modified captured images is not satisfactory, the process advances to box 685, where the geometric transform functions by which the portions of the counterpart images were identified are updated, e.g., to relocate, enlarge, contract or otherwise modify the portions of counterpart images that are selected for a given image pixel. Alternatively, the geometric transform functions may be modified to account for vehicle dynamics or imaging device attributes in different ways. The process then returns to box 635, where one or more images are captured by the imaging device.

If the quality of the modified captured images is satisfactory, however, then the process advances to box 680, where the modified captured images are utilized in the airborne operations, e.g., for computer vision applications, navigation, guidance, or collision avoidance, or for any other purpose. At box 690, whether the airborne operations of the aerial vehicle are to continue is determined. If the airborne operations are to continue, then the process returns to box 635, where one or more images are captured by the imaging device. If the airborne operations are no longer desired, then the process ends.

Figure 7B:
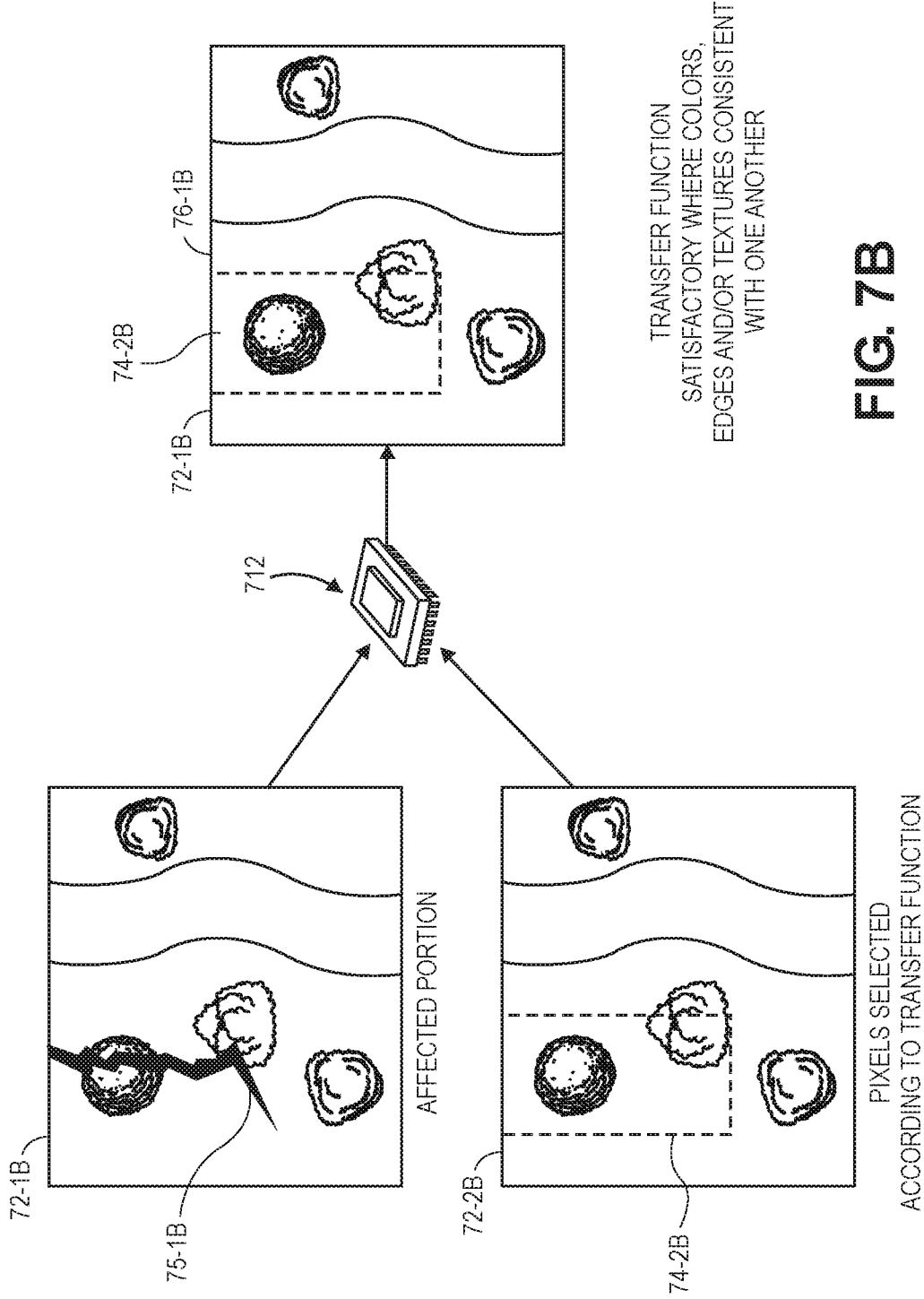

As is discussed above, the effectiveness of one or more transform functions for identifying portions of a counterpart image that are to be patched onto or otherwise used to modify images captured by imaging devices that are experiencing one or more anomalies may be evaluated based on the extent to which lines, stitches or other boundaries or borders of the portions of the counterpart image are visible within the modified images. Referring to FIGS. 7A and 7B, views of aspects of one system for inpainting image feeds of operating vehicles in accordance with embodiments of the present disclosure are shown. Except where otherwise noted, reference numerals preceded by the number "7" shown in FIGS. 7A and 7B indicate components or features that are similar to components or features having reference numerals preceded by the number "5" shown in FIGS. 5A and 5B, by the number "4" shown in FIGS. 4A through 4D, by the number "2" shown in FIG. 2 or by the number "1" shown in FIGS. 1A through 1G.

As is shown in FIG. 7A, an image 72-1A of a scene captured by an imaging device provided aboard an aerial vehicle (not shown) is experiencing one or more anomalies, resulting in the appearance of an affected portion 75-1A within the image 72-1A. The anomalies experienced by the imaging device may include one or more of a cracked lens, an improper alignment or orientation, one or more specularities, a motor failure, moisture, dirt or other debris, fouling, or any other adverse conditions. As is also shown in FIG. 7A, an image 72-2A of the scene captured by an imaging device that is apparently not experiencing any anomalies does not include the affected portion 75-1A or any other adverse visual effects. The image 72-2A may be a counterpart to the image 72-1A that is captured at the same time by another imaging device, e.g., another imaging device provided aboard the aerial vehicle, such as a component part of a stereo rig, or an imaging device provided aboard another aerial vehicle, an orbiting satellite, or in any other location. Alternatively, the image 72-2A may have been captured by the same imaging device that captured the image 72-1A, e.g., at an earlier time, such as when the imaging device was not experiencing the one or more anomalies that resulted in the appearance of the affected portion 75-1A within the image 72-1A.

In accordance with the present disclosure, a portion 74-2A of the image 72-2A includes pixels that are selected according to transform functions established for the pixels of an image plane of the imaging device that captured the image 72-1A, or for the pixels of the image 72-1A, in any manner. For example, the transform functions may have taken into account a velocity, an altitude, an orientation, or any other factor regarding the dynamics of the aerial vehicle, as well as any attributes of the imaging device that captured the image 72-1A (e.g., an axis of orientation, a focal length, an aperture width, a depth of field or a field of view), or any other factor such as weather or environmental conditions, surface conditions, or the like.

The portion 74-2A may be rotated and/or repositioned to correspond to a location of the affected area 75-1A of the image 72-1A, and patched or otherwise incorporated into the image 72-1A, e.g., by combining the portion 74-2A with a balance of the image 72-1A that does not include the affected area 75-1A, or in any other manner. A modified image 76-1A that includes the balance of the image 72-1A and the portion 74-2A is generated accordingly.

The efficacy of the transform functions that resulted in the selection of the pixels of the portion 74-2A of the image 72-2A may be assessed or determined by evaluating the modified image 76-1A, including but not limited to edges or interfaces between the portion 74-2A and the balance of the image 72-1A, as well as pixels on either side of such edges or interfaces. As is shown in FIG. 7A, where the pixels of the portion 74-2A do not adequately correspond to the underlying background features associated with the affected area 75-1A, or where pixels at the edges or interfaces of the portion 74-2A do not adequately correspond with adjacent pixels of the balance of the image 72-1A, the transform function may be adjusted to increase or decrease the effects of velocity, altitude and/or orientation of the aerial vehicle or the various attributes of the imaging device on the selection of pixels in a counterpart image, or to expand or contract a size of a portion of the counterpart image selected for a given pixel of an image.

As is shown in FIG. 7B, an image 72-1B of a scene captured by an imaging device provided aboard an aerial vehicle (not shown) is experiencing one or more anomalies, resulting in the appearance of an affected portion 75-1B within the image 72-1B. As is also shown in FIG. 7B, an image 72-2B of the scene captured by an imaging device that is apparently not experiencing any anomalies does not include the affected portion 75-1B or any other adverse visual effects. The image 72-2B may be a counterpart to the image 72-1B that is captured at the same time by another imaging device, e.g., another imaging device provided aboard the aerial vehicle, such as a component part of a stereo rig, or an imaging device provided aboard another aerial vehicle, an orbiting satellite, or in any other location. Alternatively, the image 72-2B may have been captured by the same imaging device that captured the image 72-1B, e.g., at an earlier time.

In accordance with the present disclosure, a portion 74-2B of the image 72-2B includes pixels that are selected according to transform functions established for the pixels of an image plane of the imaging device that captured the image 72-1B, or for the pixels of the image 72-1B, in any manner. The portion 74-2B may be rotated and/or repositioned to correspond to a location of the affected area 75-1B of the image 72-1B, and patched or otherwise incorporated into the image 72-1B, e.g., by combining the portion 74-2B with a balance of the image 72-1B that does not include the affected area 75-1B, or in any other manner. A modified image 76-1B that includes the balance of the image 72-1B and the portion 74-2B is generated accordingly. In some embodiments, a transform function may be executed on the modified image 76-1B, or on the portion 74-2B within the modified image 76-1B, and any surrounding or neighboring pixels of the balance of the image 72-1B, to adjust colors or other attributes of one or more such pixels, e.g., by color matching, histogram stretching, histogram equalization, contrast stretching, range expansion or any other technique, such as normalization, regularization or filtering.

As is also discussed above, where the modified image 76-1B is evaluated to assess or determine the efficacy of the transform functions that resulted in the selection of the pixels of the section 74-2B, or the adjustment of colors or other attributes of the pixels of the section 74-2B, and the edges or interfaces between the portion 74-2B and the balance of the image 72-1B are invisible or include visible lines or markings that are within an acceptable tolerance, the modified image 76-1B may be utilized in any applications associated with the operation of the aerial vehicle for which the image 72-1B was captured, including but not limited to computer vision applications, navigation, guidance, or collision avoidance.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
 a frame comprising:
  a first digital camera mounted to the frame, wherein the first digital camera has a first field of view; and
  a second digital camera mounted to the frame, wherein the second digital camera has a second field of view that overlaps with the first field of view at least in part; and
 at least one computer processor in communication with each of the first digital camera and the second digital camera,
 wherein the at least one computer processor is configured to at least:
  cause the first digital camera to capture a first image at a first time;
  determine that the first digital camera experienced an anomaly not later than the first time;
  identify a first portion of the first image associated with the anomaly;
  cause the second digital camera to capture a second image at approximately the first time;
  determine a pose of the first digital camera;
  select a second portion of the second image according to a geometric transform function, wherein the second portion of the second image is selected based at least in part on the pose of the first digital camera, and wherein the second portion of the second image is not smaller than the first portion of the first image;
  generate a third image, wherein the third image comprises the second portion of the second image patched onto at least the first portion of the first image; and
  determine a range to at least one object within the first field of view and the second field of view based at least in part on:

a first location of the at least one object in the second image;
a second location of the at least one object in the third image;
a first focal length of the first digital camera;
a second focal length of the second digital camera; and
a baseline distance between the first digital camera and the second digital camera.

2. The aerial vehicle of claim 1, wherein the anomaly is at least one of:
a damaged lens of the first digital camera;
an improper orientation of the first digital camera;
specular reflection from at least one surface of the at least one object; or
moisture, dirt, grease or at least one fingerprint on at least one component of the first digital camera.

3. The aerial vehicle of claim 1, wherein the second portion of the second image is selected by at least one affine transformation of the first portion of the first image, and
wherein the at least one affine transformation is one of a translation, a scaling, a shearing or a rotation.

4. The aerial vehicle of claim 1, wherein the at least one computer processor is configured to at least:
execute a color transform function on the second portion of the second image with respect to the first portion of the first image, wherein the color transform function is at least one of color matching, histogram stretching, histogram equalization, contrast stretching, range expansion or any other technique, such as normalization, regularization or filtering.

5. A method comprising:
capturing at least a first image by a first imaging device at a first time, wherein the first imaging device is provided aboard a first operating vehicle;
determining that a first portion of the first image is indicative of at least one anomaly affecting the first imaging device;
selecting a second portion of a second image, wherein the second image is captured by a second imaging device at approximately the first time, and wherein the second portion of the second image corresponds to at least the first portion of the first image;
generating a third image based at least in part on the first image and the second portion of the second image, wherein the third image comprises the second portion of the second image in a location corresponding to the first portion of the first image;
determining a range to at least a portion of an object within a first field of view of the first imaging device and a second field of view of the second imaging device based at least in part on:
a first location of the object in the second image;
a second location of the object in the third image;
a first focal length of the first imaging device;
a second focal length of the second imaging device; and
a baseline distance between the first imaging device and the second imaging device; and
storing at least one of the third image or the range in at least one data store.

6. The method of claim 5, wherein selecting the second portion of the second image comprises:
selecting at least one pixel of the second portion corresponding to at least one pixel of the first portion of the first image according to a geometric transform function.

7. The method of claim 6, wherein the geometric transform function is configured to select the at least one pixel of the second portion based at least in part on at least one of:
a velocity of the first operating vehicle;
an altitude of the first operating vehicle; or
an orientation of the first operating vehicle.

8. The method of claim 6, wherein the transform function is configured to select the at least one pixel of the second portion based at least in part on at least one of:
an aperture width of the first imaging device;
an axis of orientation of the first imaging device;
a focal length of the first imaging device;
a depth of field of the first imaging device; or
the first field of view.

9. The method of claim 5, further comprising:
prior to generating the third image,
adjusting at least the second portion of the second image according to a color transform function, wherein the color transform function is one of:
color matching, histogram stretching, histogram equalization, intensity distributions, contrast stretching, range expansion, normalization, regularization or filtering.

10. The method of claim 9, further comprising:
detecting, within the third image, at least one edge between the second portion of the second image and a third portion of the first image, wherein the third portion of the first image does not include the first portion of the first image; and
in response to detecting the at least one edge,
modifying the geometric transform function.

11. The method of claim 5,
wherein the first field of view and the second field of view overlap at least in part at the first time.

12. The method of claim 5, wherein the first operating vehicle is one of an aerial vehicle or a ground vehicle, and
wherein at least a portion of the first field of view and at least a portion of the second field of view extend forward of or below the first operating vehicle.

13. The method of claim 5, wherein the second imaging device is not provided aboard the first operating vehicle, and
wherein the first field of view and the second field of view overlap at least in part at the first time.

14. The method of claim 13, wherein the second imaging device is associated with at least one of:
an orbiting satellite, a second operating vehicle, or a ground-based structure.

15. The method of claim 5, wherein
at least one of a background feature or a foreground feature depicted within the first image is depicted within the second image.

16. The method of claim 5, wherein the second portion of the second image is not smaller than the first portion of the first image.

17. The method of claim 5, wherein the anomaly is one of:
damage to a lens of the first imaging device;
an improper orientation of the first imaging device;
saturation of at least a portion of an image sensor of the first imaging device; or
moisture, dirt or grease on the lens of the first imaging device.

18. A method comprising:
capturing, by a first imaging device provided aboard an aerial vehicle, at least a first image at a first time, wherein the first imaging device comprises a first field of view;

determining, based at least in part on a first portion of the first image, that the first imaging device is experiencing an anomaly at the first time;

identifying a second image captured at or prior to the first time according to a geometric transform function, wherein at least a second portion of the second image depicts at least one feature within a portion of the first field of view corresponding to the first portion of the first image at the first time, and wherein the second image was captured by one of a second imaging device coupled to the aerial vehicle or a third imaging device not coupled to the aerial vehicle;

generating a third image based at least in part on the first image and the second portion of the second image, wherein the third image comprises the second portion of the second image applied over at least the first portion of the first image;

executing a color transform function on at least a third portion of the third image, wherein the third portion of the third image comprises the second portion of the second image; and determining a range to at least a portion of an object within the first field of view based at least in part on:
- a first location of the object in the second image;
- a second location of the object in the third image;
- a first focal length of the first imaging device;
- a second focal length of the one of the second imaging device or the third imaging device; and
- a baseline distance between the first imaging device and the one of the second imaging device or the third imaging device.

19. The method of claim 18, wherein the second image is captured by the second imaging device at approximately the first time, and wherein a second field of view of the second imaging device overlaps the first field of view at least in part at the first time.

20. The method of claim 18, wherein the third image is captured by the third imaging device,
wherein a third field of view of the third imaging device includes at least one background feature or at least one foreground feature at the first time, and
wherein the at least one background feature or the at least one foreground feature appears within the first field of view at the first time.

* * * * *